(12) United States Patent
Goto et al.

(10) Patent No.: US 7,976,995 B2
(45) Date of Patent: Jul. 12, 2011

(54) FUEL CELL SYSTEM COMPRISING A VOLTAGE LIMIT DEVICE

(75) Inventors: Kenichi Goto, Zama (JP); Ryoichi Shimoi, Yokohama (JP); Takashi Iimori, Chuo-ku (JP); Tetsuya Kamihara, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1168 days.

(21) Appl. No.: 11/645,967

(22) Filed: Dec. 27, 2006

(65) Prior Publication Data
US 2007/0148512 A1    Jun. 28, 2007

(30) Foreign Application Priority Data

Dec. 27, 2005 (JP) ................................ 2005-375809
Dec. 28, 2005 (JP) ................................ 2005-379572

(51) Int. Cl.
H01M 8/04 (2006.01)
(52) U.S. Cl. .................. 429/429; 429/431; 429/512
(58) Field of Classification Search .............. 429/13, 429/17, 22–23, 25, 34, 428–433, 443–444, 429/446, 452, 545, 456–463, 512–516, 535; 324/76.11, 434; 204/406, 408–409

See application file for complete search history.

(56) References Cited

U.S. PATENT DOCUMENTS

| | | | | |
|---|---|---|---|---|
| 4,198,597 | A | * | 4/1980 | Sawyer ........................ 324/434 |
| 6,569,549 | B1 | * | 5/2003 | Sawyer ......................... 429/13 |
| 2002/0081466 | A1 | * | 6/2002 | Hallum et al. ................. 429/13 |

(Continued)

FOREIGN PATENT DOCUMENTS

| | | |
|---|---|---|
| JP | 11-097047 | 4/1999 |
| JP | 2005-158553 | 6/2005 |

OTHER PUBLICATIONS

Dictionary.com, LLC, (2010; http://dictionary.reference.com/browse/halt).*

(Continued)

*Primary Examiner* — Dah-Wei D Yuan
*Assistant Examiner* — Claire L Roe
(74) *Attorney, Agent, or Firm* — Osha Liang LLP

(57) ABSTRACT

A fuel cell system that has a fuel cell stack with a plurality of laminated cells, each of the laminated cells includes an electrolyte membrane interposed between a fuel electrode receiving a supply of fuel gas and an oxidizing agent electrode receiving a supply of oxidizing agent gas. A fuel gas supply device supplies a fuel gas to the fuel electrode. An oxidizing agent gas supply device supplies an oxidizing agent gas to the oxidizing agent electrode. A fuel electrode side discharge system discharges a discharge gas from the fuel electrode to an external. A circulation device re-circulates the discharge gas discharged from the fuel electrode into an upstream side of the fuel electrode. A voltage limit device limits a voltage across the fuel cell stack by drawing a current from the fuel cell stack at a time of an activation of the fuel cell system. A controller halts the supply of the oxidizing agent gas to the oxidizing agent electrode from the oxidizing agent gas supply device at the time of the activation of the fuel cell system, inhibits a discharge of the discharge gas to the external through the fuel electrode side discharge system, and starts the supply of fuel gas to the fuel electrode from the fuel gas supply device in a state where the discharge gas is circulated through the circulation device.

20 Claims, 11 Drawing Sheets

U.S. PATENT DOCUMENTS

| | | |
|---|---|---|
| 2003/0129462 A1 | 7/2003 | Yang et al. |
| 2004/0053089 A1 | 3/2004 | Balliet et al. |
| 2005/0031917 A1 | 2/2005 | Margiott et al. |
| 2005/0074649 A1 | 4/2005 | Skiba et al. |
| 2005/0142407 A1 | 6/2005 | Fuller et al. |
| 2005/0158597 A1* | 7/2005 | Saitou .............................. 429/22 |
| 2005/0244688 A1* | 11/2005 | Suzuki ............................ 429/23 |

OTHER PUBLICATIONS

Dictionary.com, LLC, (2010; http://dictionary.reference.com/browse/halting).*

International Search Report dated Jan. 14, 2008 (4 pages).

Office Action in European Patent Application No. 06850477.8.-2119, dated Sep. 8, 2010 (5 pages).

\* cited by examiner

FUEL CELL SYSTEM COMPRISING A VOLTAGE LIMIT DEVICE

CROSS-REFERENCE TO RELATED APPLICATIONS

This application claims priority to Japanese Patent Application No. 2005-375809, filed on Dec. 27, 2005, and to Japanese Patent Application No. 2005-379572, filed Dec. 28, 2005, the disclosures of which are incorporated by reference herein in their entirety.

BACKGROUND OF INVENTION

1. Field of the Invention

The present invention relates to a fuel cell system and, more particularly, relates to the fuel cell system suitable for a mobile body driving power supply repeating activations and halts.

2. Background Art

In a previously proposed fuel cell system, at a time of an activation of the fuel cell system, a supply of hydrogen to an anode is started in a state where an inflow of air to a cathode is interrupted and a circulation function of a hydrogen circulation device is halted and, then, a current is drawn from a fuel cell for hydrogen to consume oxygen left in the cathode. Then, after oxygen in the cathode is consumed, a circulation of fuel gas is started through the hydrogen circulation device (refer to page 8 and FIG. 6 of a Japanese Publication Patent Application (Tokkai) No. 2005-158553, incorporated by reference herein).

SUMMARY OF INVENTION

However, since, in the previously proposed fuel cell system described above, hydrogen is supplied with no drive of the hydrogen circulation device at the time of the activation of the fuel supply system, hydrogen is not uniformly supplied to each of the unit cells constituting the fuel cell stack. When a current is drawn to perform a voltage limit control (VLC) for suppressing a fuel cell voltage, a reversal of polarity may occur in any one or more of the unit cells in which hydrogen is deficient. This situation can cause deterioration of the fuel cell stack.

According to one or more embodiments of the present invention, a voltage limit device may be provided that limits the voltage of the fuel cell stack by drawing current from the fuel cell stack at the time of the activation of the fuel cell system. A controller may be, provided that may a supply of oxidizing agent gas to an oxidizing agent electrode (cathode) by controlling oxidizing side valves, that may inhibit a discharge of discharge gas to outside of the fuel cell system by controlling a fuel electrode (anode) side discharge device, and that may start the supply of fuel gas from a fuel gas supply device to a fuel electrode (anode) when discharge gas is circulated through the fuel electrode side of the fuel cell stack by controlling a circulation device.

According to one or more embodiments of the present invention, the supply of fuel gas is started after establishing a sufficient gas circulation flow quantity, including a quantity of hydrogen containing discharge gas existing in the system and halted from being discharged, for each of the unit cells in the fuel cell stack by using a fuel gas circulation device so that hydrogen can be uniformly supplied to each of the unit cells constituting the fuel cell stack. This circulation or recirculation of gas existing in the system upon activation reduces the possibility of a reversal of polarity in any one or more of the unit cells in which hydrogen is deficient and this suppresses the possibility of deterioration of the fuel cell stack. In addition, corrosion of the carbon support, which supports the catalyst within each cell, can be reduced or avoided according to certain alternative embodiments.

Other aspects and advantages of the invention will be apparent from the following description and the appended claims.

BRIEF DESCRIPTION OF DRAWINGS

FIG. 6A showing an fuel electrode hydrogen pressure, FIG. 6B showing a rotation speed of a circulation pump; FIG. 6C showing a stack current; and FIG. 6D showing a stack voltage, respectively.

FIG. 7D shows a stack voltage, respectively.

DETAILED DESCRIPTION

Exemplary embodiments according to the present invention will be explained in details with reference to the accompanying drawing figures. Like items in the figures are shown with the same reference number. Further, the use of "S" in the figures is equivalent to the use of "Step" in the detailed description below. In embodiments of the invention, numerous specific details are set forth in order to provide a more thorough understanding of the invention. However, it will be apparent to one of ordinary skill in the art that the invention may be practiced without all of these specific details and in various combinations of features of one or more embodiments or in combination with other useful machines and devices. Note for example, that, even though not specifically limited, each embodiment described herein below, comprises a fuel cell system suitable for a power supply of a fuel cell vehicle. In other instances, well-known features have not been described in detail to avoid obscuring the invention. Also note that although several of the embodiments are labeled in headings by number 1-5, these embodiment numbers are for convenient reference only and are not intended to limit the invention to one or another embodiment and are not intended to limit the number of embodiments as may fall within the scope of the claims.

Embodiment 1

Figure 1:
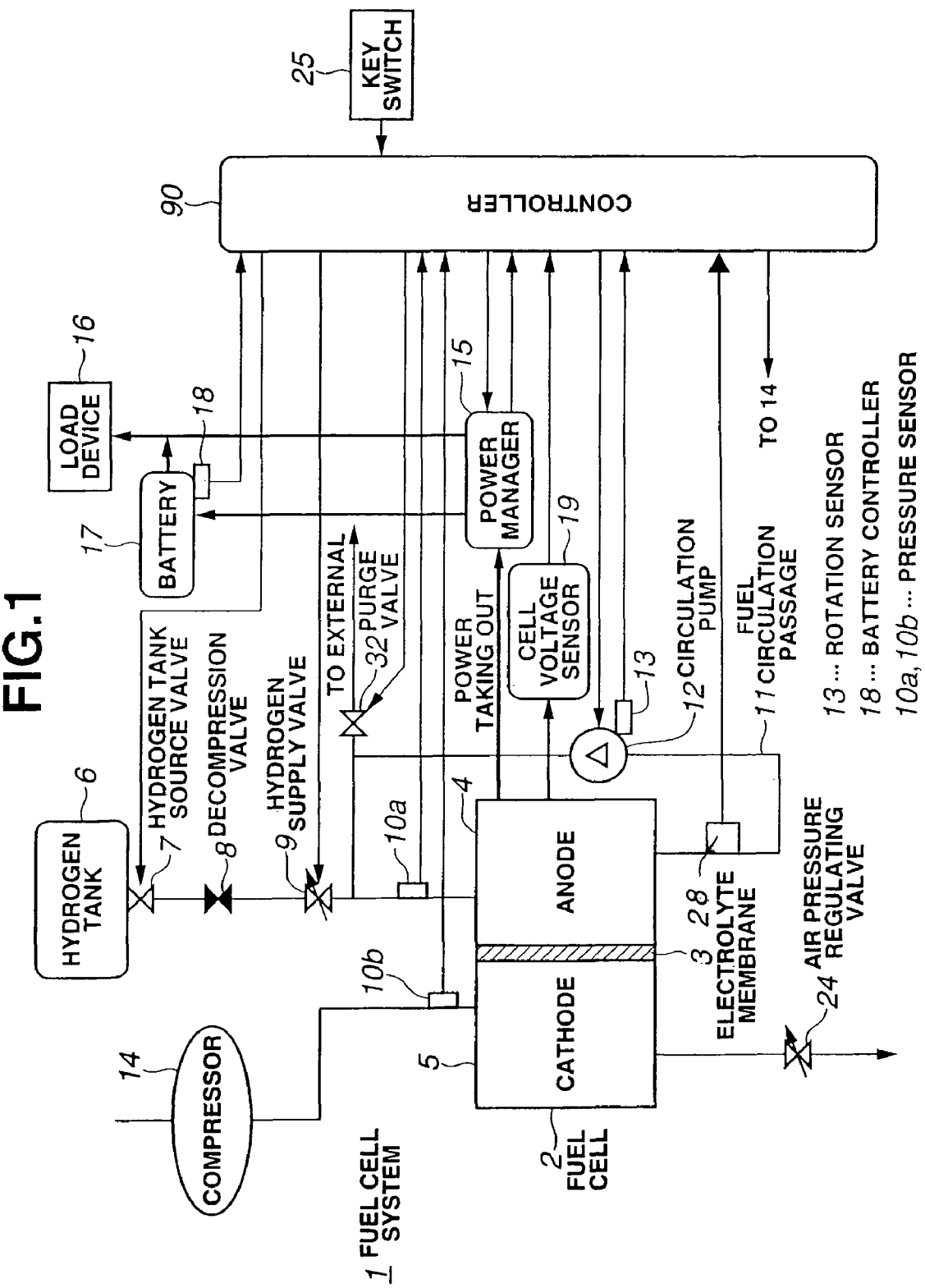
FIG. 1 shows a system configuration view representing a basic structure of a fuel cell system.

FIG. 1 shows the schematic of the configuration of a fuel cell system 1 in accordance with one or more embodiments of the present invention. In FIG. 1, fuel cell system 1 is equipped with, for example, a fuel cell stack 2 of a proton exchange membrane type (hereinafter, also simply referred to as a fuel cell). Fuel cell 2 has a structure in which a plurality of unit cells in each of which an electrolyte membrane 3 is interposed between an anode (fuel electrode) 4 and a cathode (oxidizing agent electrode) 5 may be laminated. However, in FIG. 1, only a typical unit cell is shown and the invention is not intended to be limited to this specific structure of the unit cells and the stack of cells that form the fuel cell. Note that the terms unit cells and laminated cells are sometimes used to refer in the figures to a similar element as unit cells may typically be formed as laminated cells. Hydrogen gas is supplied to fuel electrode (anode) 4 as fuel and air is supplied to oxidizing agent electrode (cathode) 5 as oxidizing agent gas. An electrode reaction progresses, generating electric power generally according to the ionization that may take place at the fuel electrode (anode) and the oxidizing agent electrode (cathode), generally as follows:

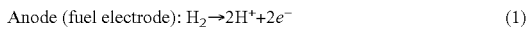
$$\text{Anode (fuel electrode): } H_2 \rightarrow 2H^+ + 2e^- \quad (1)$$

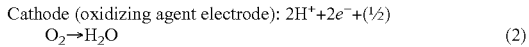
$$\text{Cathode (oxidizing agent electrode): } 2H^+ + 2e^- + (\tfrac{1}{2})O_2 \rightarrow H_2O \quad (2)$$

Water is formed at the oxidizing agent electrode 5 and part of the water becomes vapor, permeates electrolyte membrane 3, and invades fuel electrode 4. Hydrogen is supplied as fuel gas to fuel electrode 4 from a hydrogen tank (also known as a storage tank) 6 the supply of hydrogen may be controlled via a hydrogen tank source valve 7, a decompression valve 8, and a hydrogen supply valve 9. High-pressure hydrogen supplied from hydrogen tank 6 is mechanically decompressed through decompression valve 8 to a predetermined pressure and further decompressed through hydrogen supply valve 9 in order to set an appropriate desired pressure at an inlet of fuel electrode 4. Those skilled in the art upon reading the present disclosure will understand how to determine an appropriate pressure for the fuel cell configuration and structure being used. The hydrogen pressure at the inlet of fuel electrode 4 is detected by means of a fuel electrode inlet pressure sensor 10a and is inputted to a controller 90.

A fuel circulation passage 11 is provided to circulate fuel gas not consumed at fuel electrode 4 from an outlet of the fuel electrode to the inlet of the fuel electrode. A fuel circulation means such as a circulation pump 12 may be provided for circulating fuel and/or for pressure boosting fuel gas within fuel circulation passage 11. Circulation pump 12 may be rotationally driven by a rotation means such as an electric motor (not shown). The rotation speed of circulation pump 12 may be detected by a rotation sensor 13. Air or another gas containing an oxidizing agent may be supplied to oxidizing agent electrode 5 by an oxidizing agent supplying means 14 such as a compressor 14. A pressure regulating valve 24 is installed at an outlet of oxidizing agent electrode (cathode) 5 to control a pressure of the gas at oxidizing agent electrode 5.

A power manager 15 may include a current drawing means for drawing a current from fuel cell 2 and for supplying electric power to a load device 16 or a battery 17. The power manager 15 may also be called a voltage limit device. The power manager 15 acting as a voltage limit device functions to limit the voltage existing between the terminals of the fuel cell by drawing current from the fuel cell 2. A battery controller 18 monitors a discharge-and-charge current of battery 17, calculates a state of charge (SOC) of battery 17, and transmits SOC to controller 90. A cell voltage sensor 19 detects voltages across the stack of unit cells, known as the stack voltage across a plurality of groups of serially connected unit cells (cell groups), known as the cell group voltages and/or across individual unit cells or across each of the unit cells. The total of voltages of all the cell groups or all the unit cells should equal the stack voltage. In a unit cell group a plurality of unit cells are serially connected to form the unit cell group. A stack voltage is a total value of these voltages. The voltages detected by the cell voltage sensor 19 are outputted to controller 90.

In an embodiment where air is supplied as oxidizing agent to oxidizing agent electrode 5, nitrogen that is not chemically reacted permeates through the electrolyte membrane 3 and is accumulated in a hydrogen circulation system including in the fuel electrodes 4, in the fuel circulation passage 11, and in the circulation pump 12. If a quantity of nitrogen that is accumulated in the hydrogen circulation system becomes excessively large, a mass density of air in the hydrogen circulation system increases. Thus, since the gas circulation quantity through circulation pump 12 cannot be maintained, it is useful to manage the nitrogen quantity within the hydrogen circulation system through circulation pump 12. Hence, gas containing nitrogen within the hydrogen circulation system is discharged to outside of fuel cell system 1 by means of a purge valve 32. Thus, a circulation performance can maintain the quantity of nitrogen present within the hydrogen circulation system. Fuel electrode inlet pressure sensor 10b is a sensor that measures the pressure of gas at the inlet of fuel electrode 4 the measured pressure value is inputted to controller 90. In addition, a signal of a key switch 25 to command a driving halt of fuel cell system 1 is inputted to controller 90.

Controller 90 is controls each actuator within the system using the sensor signals at a time of an activation of the fuel cell system. Controller 90 may for example halt activation of the fuel cell, and may halt power generation thereof. The actuators within the system may be configured to control the gas supply of oxidizing agent gas and fuel gas, to control the gas recirculation of the fuel circulation passage, to control discharging of gas containing an impurity, and to control drawing of a current from fuel cell 2.

Note that in one embodiment controller 90 includes a microcomputer having a CPU (Central Processing Unit), a ROM (Read Only Memory) storing control programs and control parameters in the form of machine readable instructions and data for execution by the CPU, a working RAM (Random Access Memory), and Input/Output Interfaces. The control function of the controller is achieved by execution of the control programs.

Figure 7:
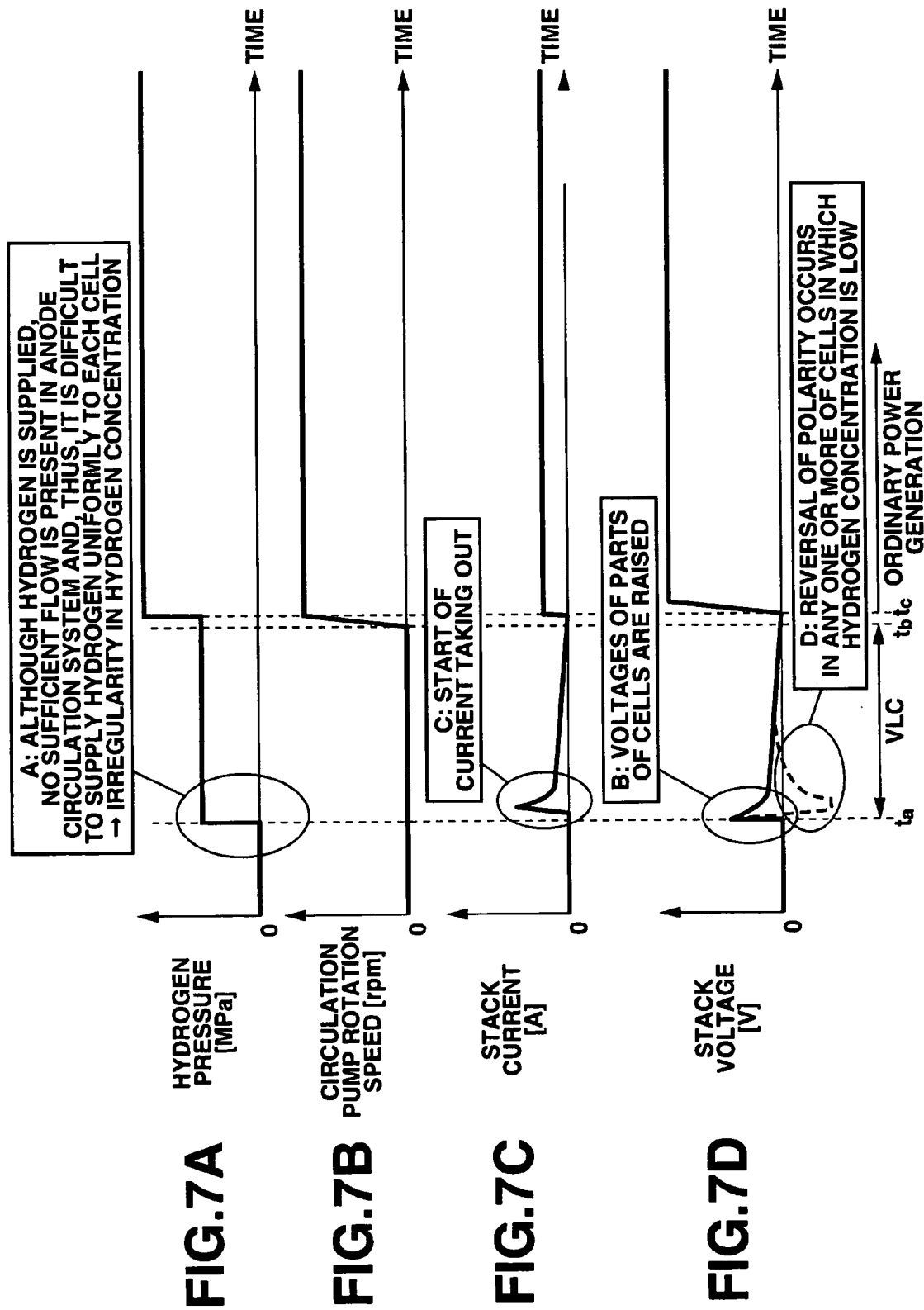
FIGS. 7A through 7D together show a timing chart for explaining a comparative example to the present invention, FIG. 7A showing the fuel electrode hydrogen pressure, FIG. 7B showing the rotation speed of the circulation pump, FIG. 7C showing the stack current.

FIGS. 7A through 7D together depict a timing chart of a comparative example to the present invention at the time of the activation of fuel cell system 1. The timing chart represents an operational example in which the circulation pump is turned on only after the hydrogen is supplied to the fuel electrode 4. FIG. 7A shows a hydrogen pressure at fuel electrode 4. FIG. 7B shows a rotation speed of the circulation pump which in this embodiment corresponds to the hydrogen circulation device. FIG. 7C shows a stack current. FIG. 7D shows a stack voltage. For example, suppose that, at a time point $t_a$, the hydrogen supply valve is opened to start the supply of hydrogen to the fuel electrode under a first pressure, with the circulation pump halted. When this hydrogen supply is started, hydrogen is supplied to the fuel electrode 4, and the stack voltage starts to rise. In a typical fuel cell the hydrogen is supplied without a significant increase in pressure or flow. In order to reduce or avoid deterioration of the fuel cell due to a high voltage state, the VLC (Voltage Limit Control) acts to suppress the stack voltage by drawing current from the fuel cell stack. Typically, a reversal of polarity of one or more of the cells in which a hydrogen concentration is low often occurs when drawing down the current. The inventors have discovered that a distribution of hydrogen to each of the cells from a fuel supply manifold of the fuel cell stack is not uniform. It has been found by the inventors that the lack of uniform distribution is due to only supplying hydrogen without a circulation pump. The flow of gas to the fuel cell stack is not sufficient to distribute the hydrogen to each of the cells uniformly from a fuel supply manifold and throughout the entire fuel cell stack. Thus, an irregularity of hydrogen concentration among the respective cells occurs. Thereafter, the circulation pump is activated at a time point $t_b$ and the hydrogen pressure is raised from the first pressure to a second pressure (or a driving pressure) which is higher than the first pressure at a time point $t_c$ at which the rotation speed of the circulation pump is raised to a predetermined speed.

Figure 2:
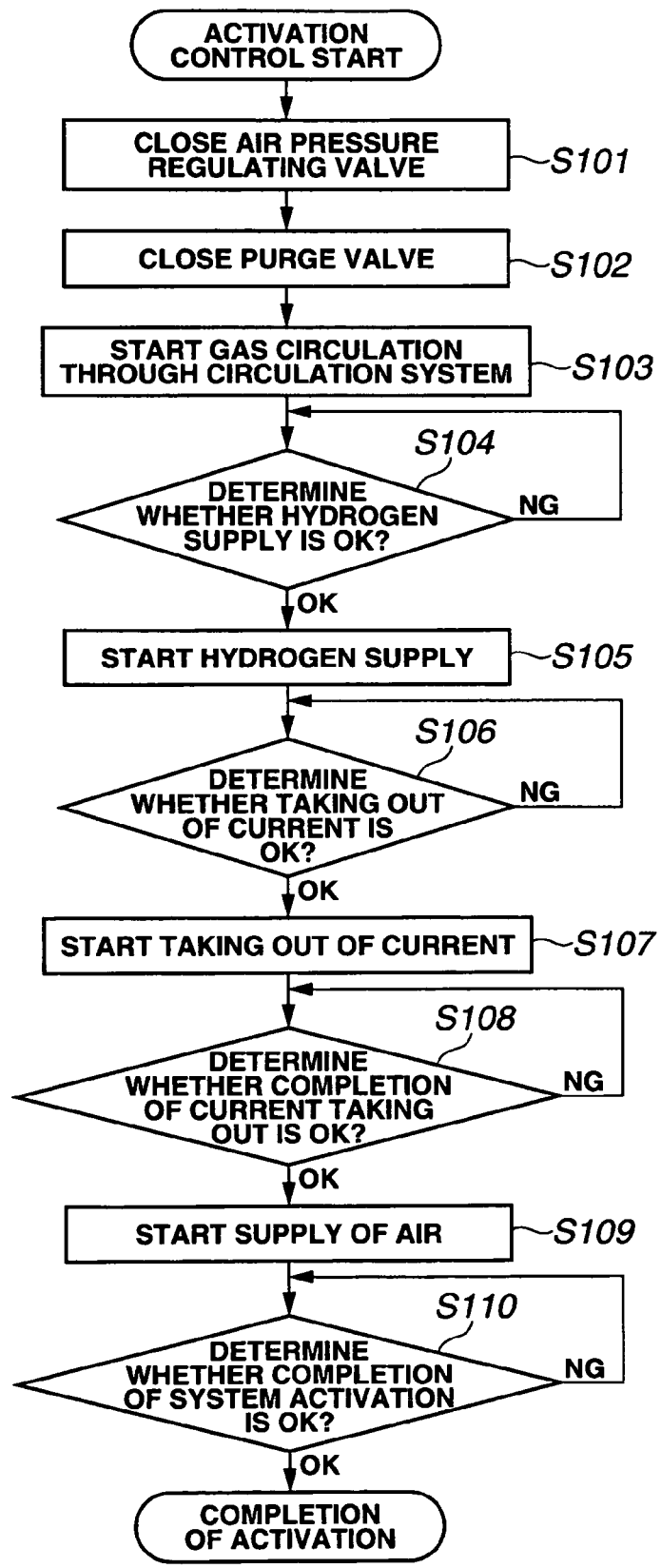
FIG. 2 shows a flowchart of a process at a time of activation of the fuel cell system in accordance with one or more embodiments of the present invention.

Next, an operation of the fuel cell system according to one embodiment of the invention will be explained. Thus, a fuel cell operated by controller 90 at the time of the activation of the fuel cell system will be explained with reference to a flowchart of FIG. 2 and a timing chart in each of FIGS. 6A through 6D. In a case where key switch 25 in FIG. 1 is switched from an off state to an on state or the fuel cell system is recovered from an idle stop state at a time of a low load state of the fuel cell system, a system activation control in FIG. 2 is started. When the activation control is started, first, at a step (hereinafter, abbreviated as S) S101, controller 90 closes air pressure regulating valve 24 and, at S102, closes purge valve 32. Note that, depending upon the specification of a halt state of the fuel cell system (for example, the type of the fuel cell system in which, during the halt state of the system, the air pressure regulating valve 24 and purge valve 32 are kept in a closed state), S101 and S102 might be omitted.

Next, at an S103, controller 90 activates a drive to rotate circulation pump 12 to start the circulation of gas existing within the fuel electrode 4 and fuel circulation passage 11. The circulated existing gas may be refueled to a "circulation gas." This corresponds to a time point of $t_0$ in FIGS. 6A through 6D. At time $t_0$, a target rotation speed is established for rotationally driving circulation pump 12, at which target rotation speed the circulation gas supplied to fuel electrode 4 will be uniformly distributed to each of the unit cells constituting fuel cell 2.

At S104, controller 90 determines whether the supply of hydrogen is allowed to be started and S104 is repeated until a result of determination indicates OK (allowed to be started). This determination of the allowance of start of an exchanged supply of hydrogen is based on whether a predetermined time has passed (time point $t_2$ in FIGS. 6A through 6D). That is the time required to maintain the circulation until the circulation gas within fuel electrode 4 and fuel circulation passage 11 is assumed to become approximately uniform. This determination of the start time $t_2$ supply of hydrogen may be from the time at which the rotation speed of circulation pump 12 is raised to the target rotation speed at time point $t_1$ to a predetermined time required to repeat the circulation until gas within fuel electrode 4 and fuel circulation passage 11 is appropriately assumed to become approximately uniform. This predetermined time $t_2$ is varied according to the particular volume and the particular shape of the gas flow passage inside of fuel electrode 4, the volume and the shape of fuel circulation passage 11, and the particular circulation capability of circulation pump 12. The predetermined time may be derived empirically in advance by means of an actual system, and may be stored in the controller 90.

If, at S104, controller 90 determines that the supply of hydrogen is allowed to be started (OK), the processing goes to S105. At S105, the controller 90 opens a hydrogen supply valve 9 to start the supply of hydrogen (time point $t_2$ in FIGS. 6A through 6D). At time $t_2$, circulation pump 12 is already under operation, and a gas flow to distribute the supply of hydrogen gas uniformly into each of the unit cells can be achieved. Thus, hydrogen supplied from hydrogen supply valve 9 is uniformly distributed into each of the unit cells constituting fuel cell 2.

A fuel cell 2 may be equipped with a fuel supply manifold to supply fuel gas to fuel electrode 4 and a fuel exhaust manifold to discharge fuel gas not consumed at fuel electrode 4. The rotation speed (or a range of rotation speed) of circulation pump 12 at which gas is uniformly distributed into each of the cells constituting fuel cell 2 is determined in accordance with a shape of a gas passage branching from the fuel supply manifold to the inlet of fuel electrode 4 of each of the cells constituting fuel cell 2 and in accordance with the shape of the gas passage collecting gas from the outlet of fuel electrode 4 of each of the cells to the fuel exhaust manifold.

Within a certain rotation speed region, the gas distribution to each of the cells does not stay uniform. During an ordinary driving of the fuel cell system, fuel gas with a quantity larger than that required for the power generation on the basis of a predetermined excess gas ratio (for example, about 1.5) is supplied. Hence, almost no problem is raised on the irregularity of the gas distribution. However, if, at the time of the supply of hydrogen during the activation of the fuel cell system, when the current is drawn from the fuel cell to perform VLC, the non-uniform distribution of supplied hydrogen may cause the reversal of polarity of one or more cells in which the supply of hydrogen is insufficient.

In accordance with an embodiment of the present invention, before the start of the supply of hydrogen, circulation pump 12 is rotationally driven, in advance of activating the fuel cell to generate power, at the rotation speed at which fuel gas is uniformly distributed into each of the cells. Thus, when the supply of hydrogen is started, hydrogen is uniformly supplied to each of the cells. This may reduce or avoid the occurrence of the reversal of polarity of any one or more of the cells in which the supply of hydrogen might otherwise be insufficient, and the deterioration of the reversal of polarity can be prevented.

At S106, controller 90 determines whether the drawing of current from fuel cell 2 through power manager 15 may be started. If this determination is unconditionally established, the processing may immediately go to S107 at which the drawing of current from fuel cell 2 is carried out. Alternatively, upon a confirmation that the voltage across each of the cells (or each cell group) detected by cell voltage sensor 19 is equal to or higher than a predetermined value (for example, several ten millivolts [mV]) so that hydrogen has started to reach each of the cells, the determination that the drawing of the current from fuel cell 2 is allowed to be started may be made.

Figure 6:
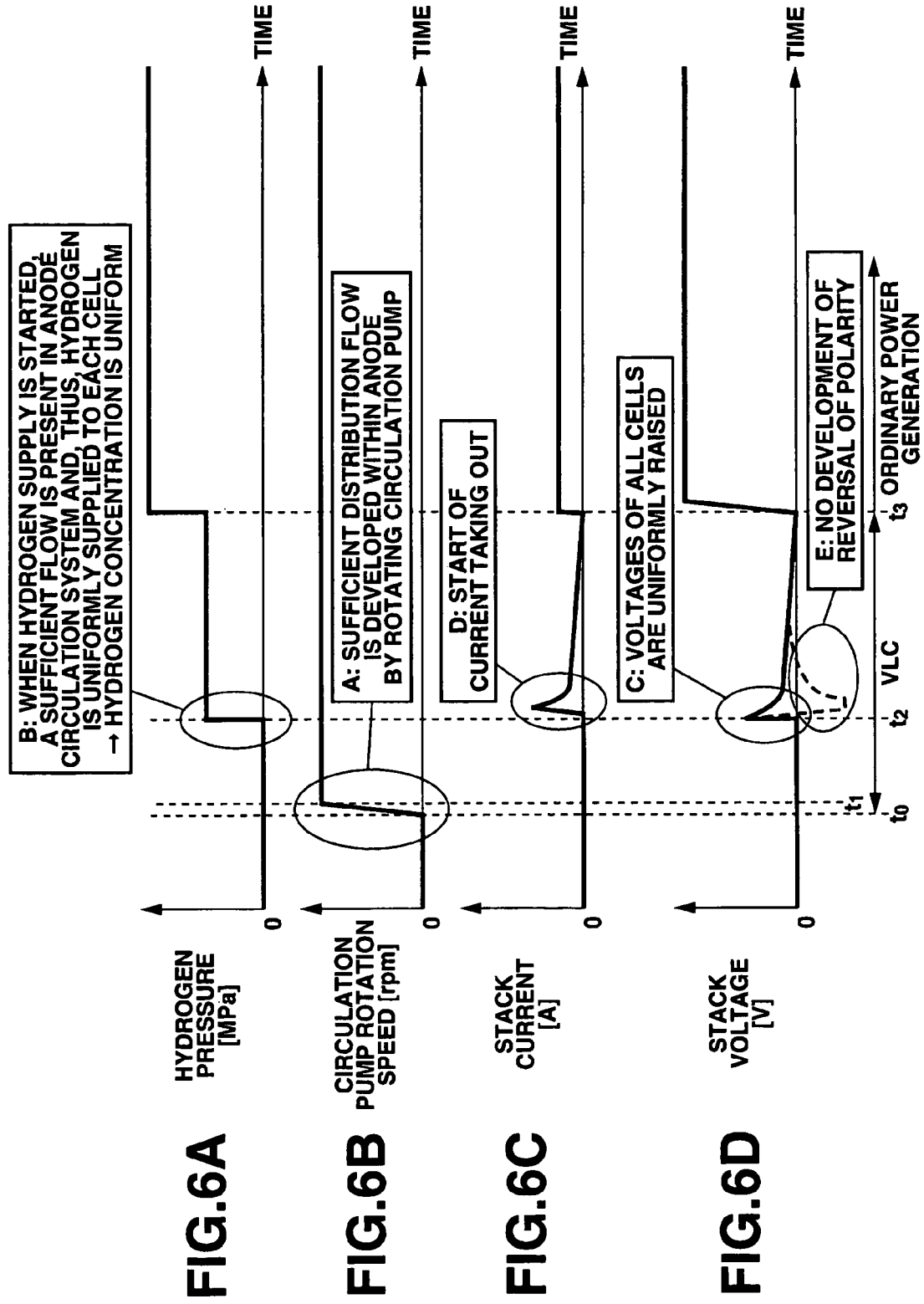
FIGS. 6A through 6D show a timing chart for explaining an operation, an action, and an effect of an embodiment according to FIG. 2.

If controller 90 determines that the drawing of current is allowed to be started (OK) at S106, the processing goes to S107. Controller 90 commands power manager 15 to draw the current from fuel cell 2. At this time, the current drawn may be used to charge battery 17 or may be consumed within an inside of power manager 15. This drawing of current causes oxygen in air within oxidizing agent electrode 5 to be consumed. As shown in FIG. 6D, a rise in the stack voltage of fuel cell 2 is limited.

Note that, since air pressure regulating valve 24 is closed and compressor 14 is not rotated, oxidizing agent electrode 5 is tightly closed and oxygen within oxidizing agent electrode 5 is consumed through the power generation reaction together with the current consumption. Thus, the current being drawn is reduced toward zero as shown in FIG. 6C.

At S108, controller 90 determines whether a completion of the drawing of current is allowed to be completed. Controller 90 is in a wait state at S108 until the drawing of current is allowed to be completed. A determination condition of the completion of the drawing of current is that, for example, the current drawn becomes equal to or smaller than a predetermined current value. At this time, the drawn current does not reduce completely to zero due to a slight quantity of air leaking in from the compressor whose rotation is halted or, in circumstances required, due to air leakage from air pressure regulating valve 24. There is often the case where the drawn current is settled at a small current value which may be very small as compared with a rated current of fuel cell 2 (for example, an order of 100 amperes [A] in a fuel cell designed for automobile drive purpose). Therefore, a predetermined current value at S108 is determined empirically taking into consideration air tightness performance of compressor 14 at the time of rotation halt. For example, the predetermined current value can be several tens of milliamperes [mA].

If controller 90 determines that the drawing OF current is allowed to be completed at S108, the processing goes to S109. At S109, compressor 14 is activated to start the supply of air to oxidizing agent electrode 5 and raises the hydrogen pressure at fuel electrode 4 to a driving pressure (refer to FIG. 6A) (at a time point $t_3$ in FIGS. 6A through 6D). At S110, when the air pressure at the inlet of oxidizing agent electrode 5 has arrived at the driving pressure, controller 90 ascertains the completion of the activation of the fuel cell system. Note that NG in FIG. 2 means "no good" (or not allowed).

Figure 3:
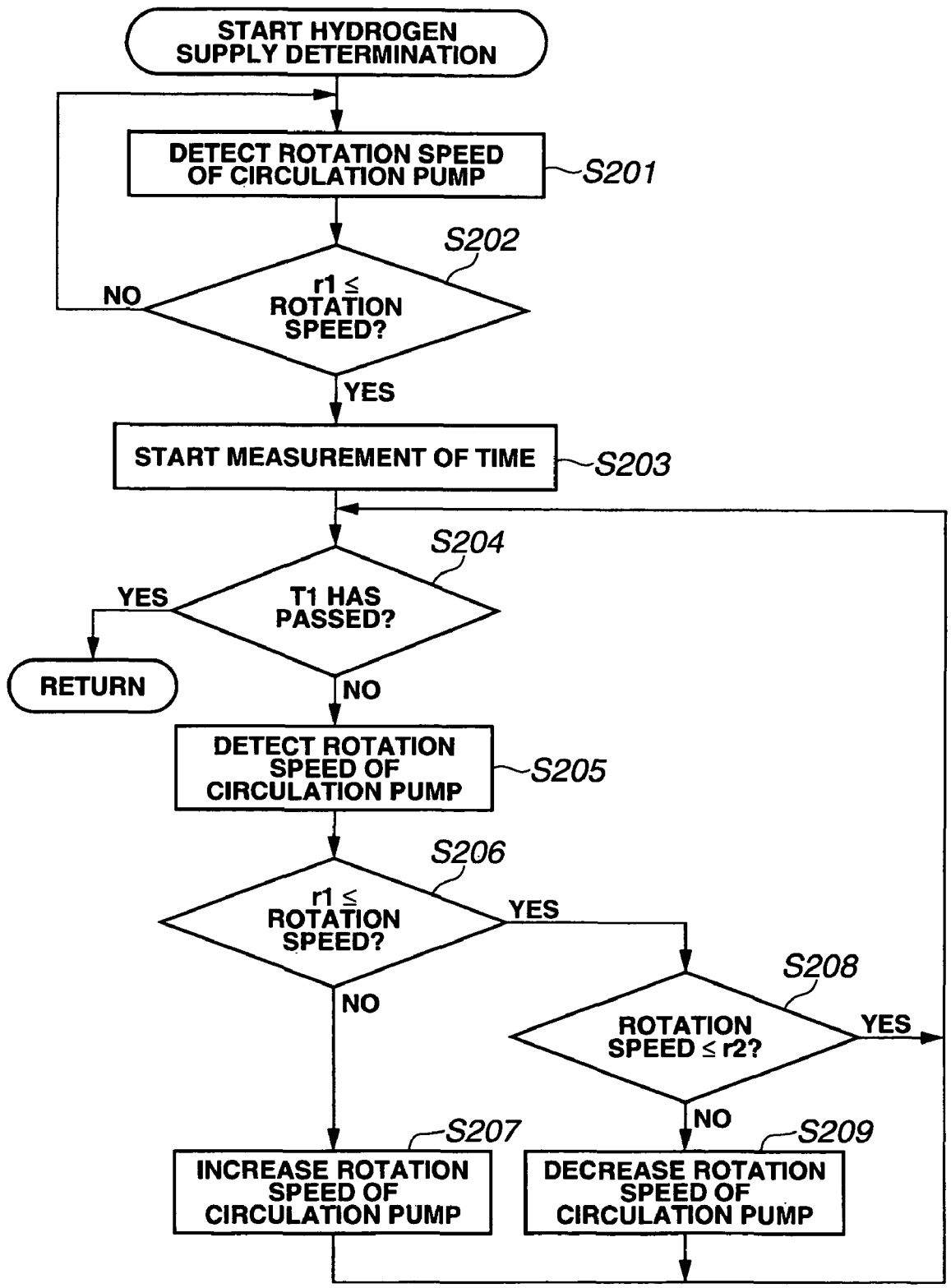
FIG. 3 shows a flowchart of a process for determining a supply of hydrogen in accordance with one or more embodiments of FIG. 2.

Next, the details of the determination of the supply of hydrogen at S104 of FIG. 2 in an embodiment of the present invention will be made with reference to a flowchart shown in FIG. 3. In FIG. 3, when the determination of the supply of hydrogen is started, first, at S201, controller 90 reads the rotation speed of circulation pump 12, as may be detected by rotation sensor 13. At S202, controller 90 determines whether the rotation speed is equal to or higher than a first predetermined rotation speed r1. If the rotation speed is not equal to or higher than first predetermined rotation speed r1 (No), the processing is returned to S201. If, at the determination of S202, the rotation speed is equal to or higher than first predetermined speed r1, the processing goes to S203. Note that a rotation speed region which is equal to or higher than first predetermined rotation speed r1 and which is lower than a second rotation speed r2 (r1<r2) is a region of rotation speed of circulation pump 12 in which gas is uniformly distributed into each of the cells of fuel cell 2.

At S203, controller 90 may measure a time in terms of an elapsed time. This time measurement utilizes a software timer incorporated into controller 90 or a hardware timer. At S204, controller 90 determines whether the elapsed time has exceeded a first predetermined time T1. If controller 90 determines that the elapsed time has not exceeded the first predetermined time T1 (No), the processing goes to S205. If the elapsed time has exceeded the first predetermined time T1, the condition for the starting the supply of hydrogen is established and the processing, shown in FIG. 3, is returned to a main routine, shown in FIG. 2.

At S205, controller 90 reads the rotation speed of circulation pump 12 detected by rotation sensor 13. If the controller 90 determines that the rotation speed is not equal to or higher than first predetermined rotation speed r1, the routine goes to S207 at which the rotation speed of the circulation pump 12 is increased and the processing is returned to S204.

If controller 90 determines that the rotation speed is equal to or higher than first predetermined rotation speed r1 at S208, the processing goes to S208. At S208, controller 90 determines whether the rotation speed of the circulation pump 12 is equal to or higher than a second predetermined rotation speed r2. If controller 90 determines that the rotation speed is equal to or lower than the second predetermined rotation speed r2 (Yes), the rotation speed is within the rotation speed range of circulation pump 12 in which gas is uniformly distributed to each of the cells of fuel cell 2, and the processing is returned to S204.

If controller 90 determines that the rotation speed is not equal to or lower than the second predetermined rotation speed r2 (No), the processing goes to S209 at which the rotation speed of circulation pump 12 is decreased and the processing is returned to S204. As described above, if the elapsed time has exceeded the first predetermined time T1 and the rotation speed of circulation pump 12 falls in a range from first predetermined rotation speed r1 to second predetermined rotation speed r2, controller 90, then, determines that the condition on the start of the supply of hydrogen is established and the routine can be returned to the main routine shown in FIG. 2.

Note that the rotation speed range in which the rotation speed is equal to or higher than the first rotation speed r1 and equal to or lower than the second rotation speed r2 is the rotation speed at which circulation gas is uniformly distributed to each of the cells of the fuel cell. However, in an alternative embodiment, the rotation speed range may be equal to or higher than the rotation speed of the circulation device at which a gas flow quantity at the inlet of fuel gas of fuel electrode 4 (anode) of fuel cell 2 becomes equal to the gas flow quantity at the outlet of fuel gas of fuel electrode 4.

As described hereinabove, in this embodiment of the present invention, in a state in which the circulation pump to circulate gas between the fuel electrode and the fuel circulation passage is operated for a sufficient gas flow quantity to be present in each of the cells, the supply of hydrogen to the fuel cell can be started. Even if the current is drawn from the fuel cell stack during VLC with hydrogen supplied uniformly to each of the cells, the reversal of polarity can be prevented from occurring.

Embodiment 2

The following describes, the fuel cell system in accordance with an alternative embodiment of the present invention. The structure of embodiment is similar to the one described for the embodiment described and shown in connection with FIG. 1. In addition, the flowchart at the time of activation of the fuel cell system by the controller in embodiment 2 is similar.

A feature of this alternative embodiment is that, in a case where hydrogen is present within the fuel electrode at the time of activation of the fuel cell system, the cell voltage for each of the cells is detected when the circulation of gas between the fuel electrode and the fuel circulation passage is carried out with the circulation device activated and before the supply of hydrogen to the fuel electrode is started. The rotation speed of the circulation device is adjusted such that a deviation of each of detection values of the cell voltages falls within a predetermined value.

Figure 4:
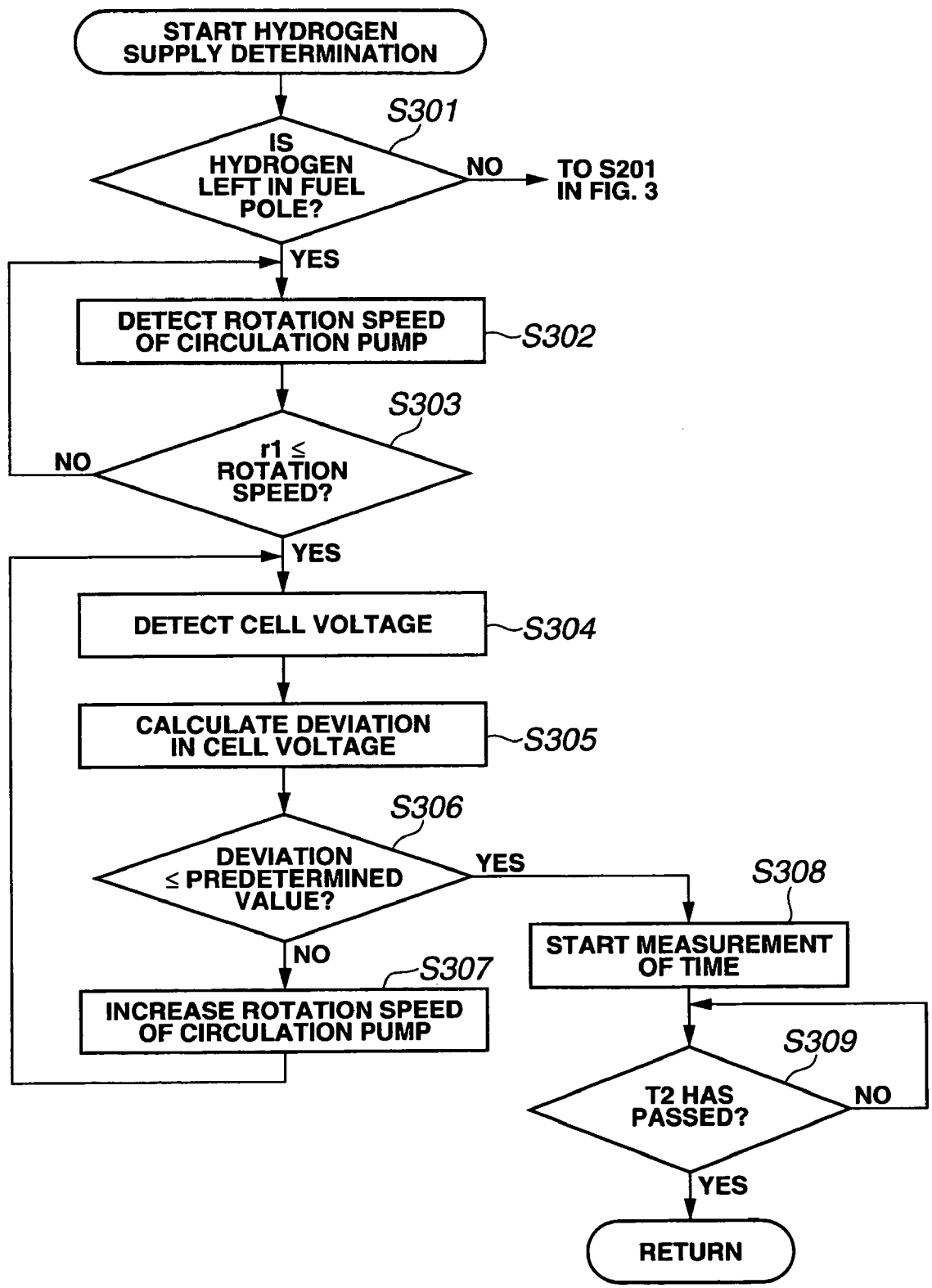
FIG. 4 shows a flowchart of a process for determining the supply of hydrogen using deviations in cell voltage, in accordance with an alternative embodiment of the present invention.

The details of the determination on the supply of hydrogen at S104 of FIG. 2 in this embodiment will be described with reference to FIG. 4. When the hydrogen supply determination in FIG. 4 is started, controller 90 first determines, at S301, whether hydrogen is left within the fuel electrode (anode). This determination can be based on, for example, whether the elapsed time from a time at which a previous driving of the fuel cell system is halted has exceeded a predetermined time or whether a detection value of a hydrogen concentration sensor 28 installed within fuel electrode 4 or fuel circulation passage 11 is equal to or lower than a concentration at which the fuel cell is not deteriorated even if a hydrogen front is developed. Other bases might also be used to determine whether hydrogen is left in fuel electrode 4.

If, at S301, the controller 90 determines that hydrogen is not present (No), the processing goes to S201 in FIG. 3 and, thereafter, the same processing as described in the embodiment as describe in connection with FIGS. 1 and 2 above may be carried out. If the controller 90 determines that hydrogen is present (Yes) at S301, the processing goes to S302 at which the controller 90 reads the rotational speed of circulation pump 12, as may be detected by rotation sensor 13. At S303, the controller 90 determines whether the rotation speed is equal to or higher than first predetermined speed r1. If the rotation speed is not equal to or higher than first predetermined rotation speed r1 (No), the processing is returned to S302. If the controller 90 determines that the rotation speed is equal to or higher than the first predetermined rotation speed r1 (Yes) at S303, the processing goes to S304. Note that the first predetermined rotation speed r1 is a rotation speed derived empirically at which the rotation speed of the circulation pump 12 becomes stable and may be a lowest rotation speed of the circulation pump 12 at which gas is uniformly distributed into each of the unit cells of the fuel cell 2, in the same way as described with respect to embodiment 1 above.

At S304, controller 90 reads the cell voltage of the fuel cell 2 (or a voltage of the cell group) detected by the cell voltage sensor 19. At S305, the controller 90 calculates the deviation in the detected cell voltage. A method of calculating the deviation of the detected cell voltage includes a calculation of a standard deviation or of derivations of a maximum cell voltage and of a minimum cell voltage, respectively, to calculate the difference therebetween.

At S306, the controller 90 determines whether the deviation of the detected cell voltage falls within a predetermined value for allowable deviation that will indicate that reversal of polarity will not occur. If controller 90 determines that the deviation of the detected cell voltage does not fall within the predetermined value (No), the processing goes to S307. At S307, the rotation speed of circulation pump 12 is increased and the processing is returned to S304. If controller 90 determines that the deviation of the detected cell voltage falls within the predetermined value (Yes), the processing goes to S308. The predetermined value used for the determination at S306 is an empirically derived value, at which the reversal of polarity does not occur when the current is drawn from fuel cell 2 for VLC, even if the deviation of the detected cell voltage is present. This predetermined value is determined and/or known in advance and stored in the controller 90, At S308, the controller 90 starts a measurement of the elapsed time. This elapsed time measurement may utilize the software timer incorporated in controller 90 or the hardware timer. Next, at S309, controller 90 determines whether the elapsed time has exceeded a second predetermined time T2. If not passed second predetermined time T2 (No), controller 90 waits at S309. If the elapsed time has exceeded second predetermined time T2, the condition on the start of the supply of hydrogen is established and the processing is returned to the main routine. As described above, if the elapsed time has exceeded second predetermined time T2 in a state where the deviation of the detected cell voltage falls within the predetermined value, the condition on the start of the supply of hydrogen is established and the processing can be returned to the main routine.

According to the embodiment 2 of the present invention, described hereinabove, in addition to the effects achieved by embodiment 1, the rotation speed of the circulation device is controlled so that a more reliable prevention of the occurrence of the reversal of polarity can be achieved.

Embodiment 3

The following describes, the fuel system in accordance with another alternative embodiment 3 of the present invention. The structure of embodiment 3 is similar to that of embodiment 1 and shown in FIG. 1. In addition, the flowchart at the time of the activation of the fuel cell system by the controller 90 in embodiment 3 is similar to that of embodiment 1, and as shown in FIG. 2.

A feature of this embodiment 3 is that, in a case where hydrogen is left within the fuel electrode at the time of activation of the fuel cell system, before the supply of hydrogen is started, the cell voltage at an inlet side of fuel gas of the fuel cell and that at an outlet side of fuel gas of the fuel cell are detected and the rotation speed of the circulation device is adjusted for a difference between these cell voltages to fall within a predetermined value when the gas circulation between the fuel electrode and the fuel circulation passage is carried out with the circulation device activated.

Figure 5:
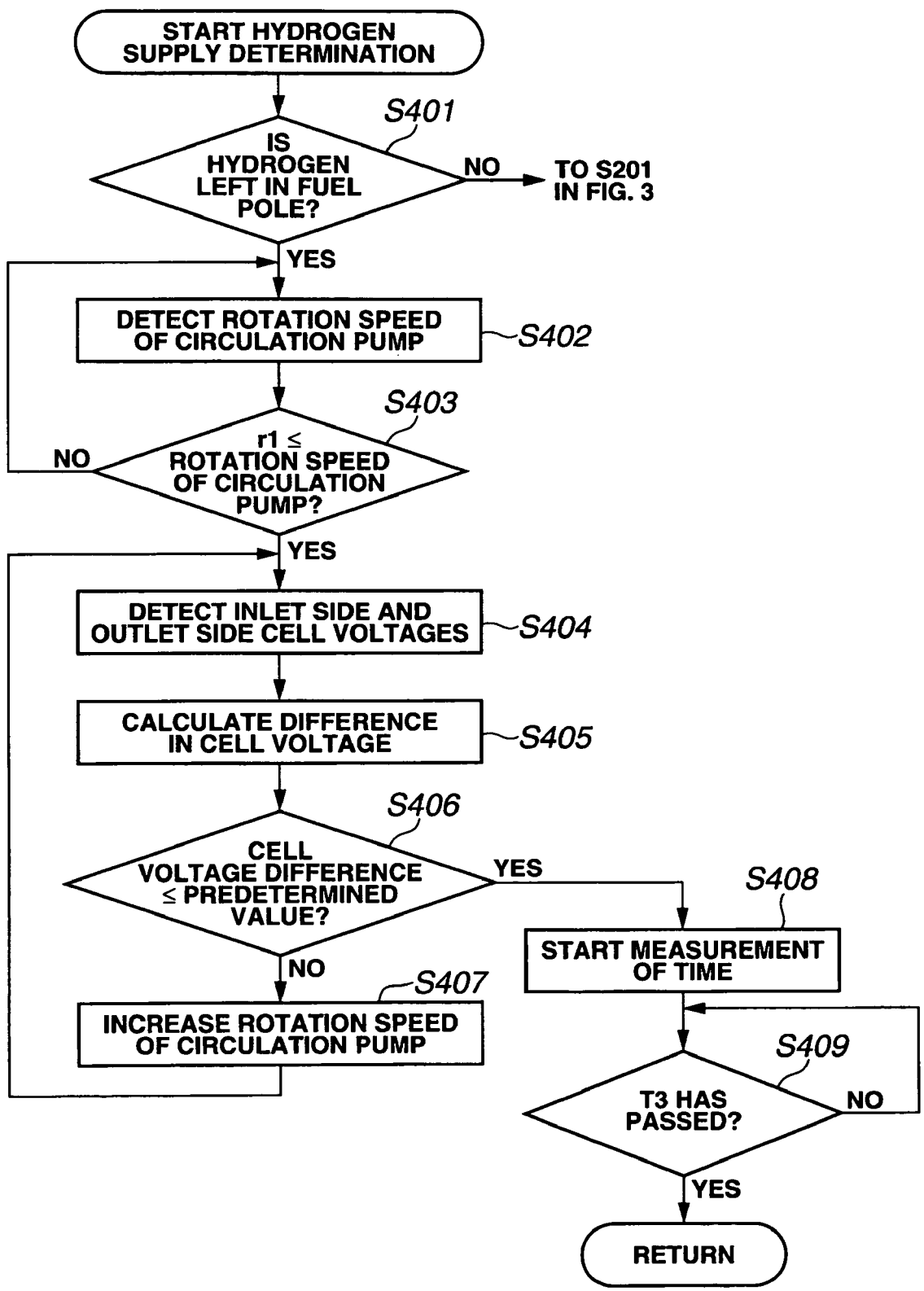
FIG. 5 shows a flowchart of a process for determining the supply of hydrogen using inlet side and outlet side cell voltages in accordance with one or more embodiments of FIG. 4.

The details of the determination of the supply of hydrogen in embodiment 3 will be described with reference to a flowchart of FIG. 5. When the determination of the supply of hydrogen is started, the controller 90 determines at S401 whether hydrogen is present within the fuel electrode (anode). This determination can be based on, for example, whether the elapsed time has exceeded a predetermined time from the time at which a previous driving of the fuel cell system was halted, and whether the detection value of the hydrogen concentration sensor 28 installed within fuel electrode 4 or fuel circulation passage 11 is equal to or lower than the concentration at which the fuel cell is not deteriorated even if a hydrogen front is developed at the catalyst membrane.

If controller 90 determines that hydrogen is not left at S401, the processing is transferred to S201 in FIG. 3 described in embodiment 1 and the same processing as embodiment 1 is, hereinafter, carried out. If the controller 90 determines that hydrogen is left at S401 (Yes), the processing goes to S402, at which the controller 90 reads the rotation speed of circulation pump 12, as may be detected by rotation sensor 13. At S403, controller 90 determines whether rotation speed of circulation pump 12 is equal to or higher than a first predetermined rotation speed r1. If the rotation speed is not equal to or higher than the first predetermined rotation speed r1 at S403, the processing is returned to S402. If the rotation speed is equal to or higher than the first predetermined speed r1 (Yes), the processing goes to S404. Note that this first predetermined rotation speed r1 is a rotation speed at which the rotation speed of circulation pump 12 becomes stable and may be the lowest rotation speed of circulation pump 12 at which gas is uniformly distributed into each of the cells of fuel cell 2 in the same way as described in embodiment 1.

At S404, the cell voltage at the fuel gas inlet side of the fuel cell 2 detected by the cell voltage sensor 19 and that at the fuel gas outlet side of the fuel cell 2 are read by controller 90. At S405, the controller 90 calculates the difference between the cell voltage at the fuel gas inlet side of the fuel cell 2 and that at the fuel gas outlet side thereof.

At S406, the controller 90 determines whether the difference in the detected cell voltages is within a predetermined value. If the difference is within the predetermined value, the processing goes to S408. If the difference in the detected cell voltages is not within the predetermined value of difference, the processing goes to S408. If the difference in the cell voltages is not within the predetermined value, the processing goes to S407 at which the rotation speed of circulation pump 12 is increased and the processing is returned to S404.

If the difference in the cell voltages is within the predetermined value at S406, the processing goes to S408. At S408, the measurement of the elapsed time is started. This elapsed time measurement may utilize the software timer incorporated in the controller 90 or the hardware timer. At S409, controller 90 determines whether the elapsed time has exceeded a third predetermined time T3. If the third predetermined time T3 is not exceeded, the condition on the start of the supply of hydrogen is established and the processing can be returned to the main routine.

According to embodiment 3 described above, in addition to the effects achieved by embodiment 1, the rotation speed of the circulation device is controlled on the basis of the difference in the cell voltage at the fuel gas inlet side of the fuel cell and at the fuel gas outlet side thereof. Hence, reversal of polarity can be more positively prevented from occurring.

Embodiment 4

Figure 8:
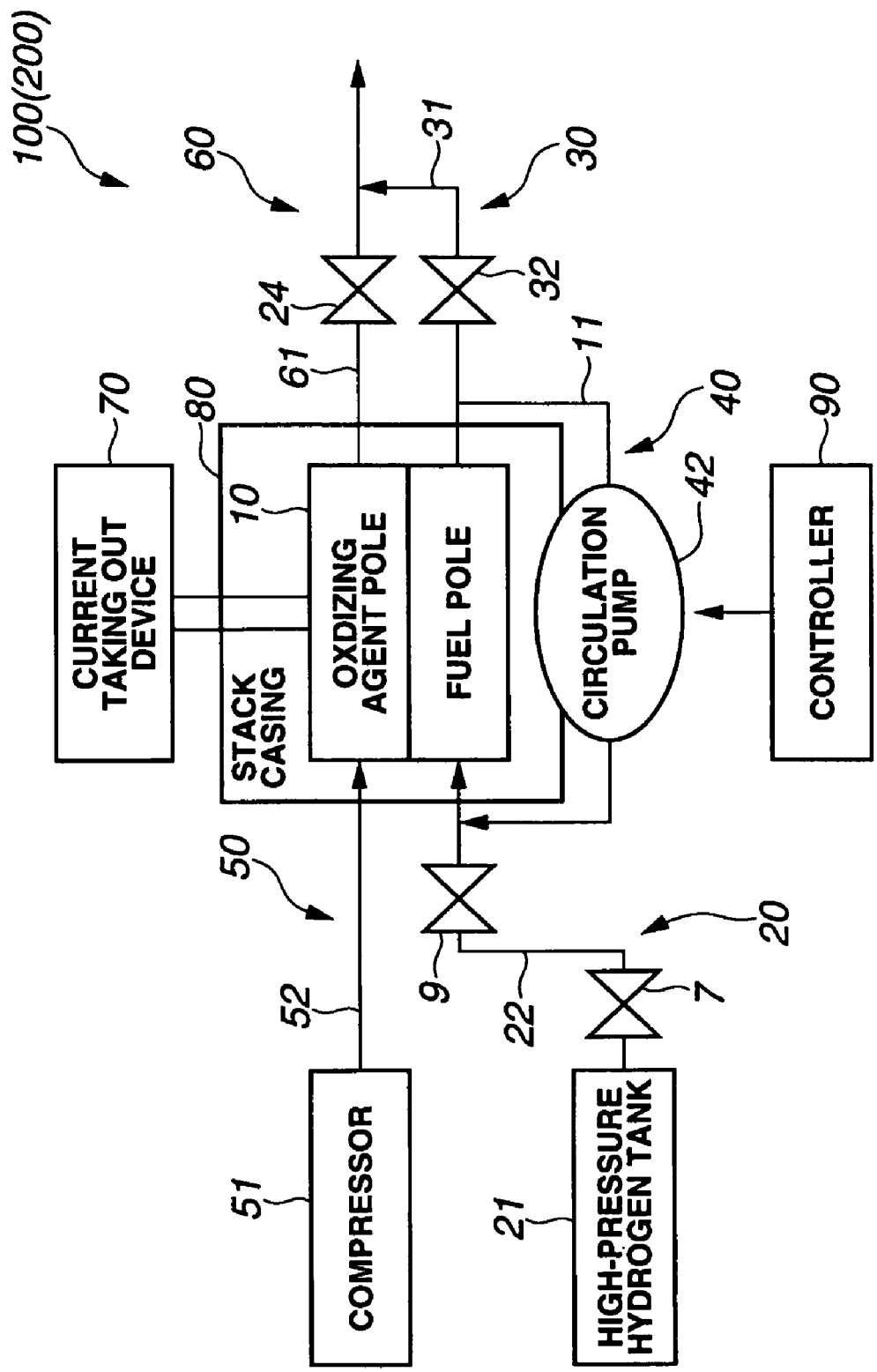
FIG. 8 shows another configuration view of a fuel cell system in accordance with one or more embodiments of the present invention.

FIG. 8 shows a configuration of a fuel cell system 100 in accordance with an embodiment 4 of the present invention. As shown in FIG. 8, the fuel cell system 100 includes fuel cell 2, a fuel gas supply system 20, a fuel electrode side discharge system 30, a circulation system 40, an oxidizing agent gas supply system 50, and an oxidizing agent electrode side discharge system 60.

Fuel cell 2 performs a power generation by reacting fuel gas with oxidizing agent gas and is provided with the fuel electrode and the oxidizing agent electrode. Hydrogen gas, which is fuel gas, is supplied to the fuel electrode. Oxygen (air) which is oxidizing agent gas is supplied to the oxidizing agent electrode. An electrochemical reaction generates power. In addition, the fuel cell and the oxidizing agent electrode are overlapped together via the electrolyte membrane to form a power generation cell. The fuel cell 2 is structured in multiple-stage laminations of a plurality of power generation cells (also known as laminate cells or unit cells). Furthermore, a catalyst made of platinum, or other appropriate catalytic material for the fuel and oxidizing agents, is supported by carbon.

Fuel gas supply system 20 supplies hydrogen gas that is fuel gas to the fuel electrode of fuel cell 2. Fuel gas supply system 20 includes: hydrogen tank 6 (in this embodiment, a high-pressure hydrogen tank 21, also known as a storage tank), a hydrogen gas supply plumbing (also known as fuel gas supply line) 22, hydrogen supply valve 9, and hydrogen tank source valve 7. The hydrogen tank 6 stores fuel gas under a predetermined pressure. The hydrogen gas supply plumbing 22 has one end connected to the hydrogen tank 6 and the other end connected to the inlet of the fuel electrode of the fuel cell 2 to introduce hydrogen gas from the hydrogen tank 6 into the fuel cell 2. The hydrogen supply valve 9 is installed in the hydrogen gas supply plumbing 22 to release or interrupt a flow passage by an opening or closure operation thereof. Hydrogen tank source valve 7 is installed in a portion of the hydrogen gas supply plumbing 22 from the hydrogen supply valve 9 to the fuel cell 2. By adjusting an opening angle of the hydrogen tank source valve 7, the quantity of hydrogen gas supplied to the fuel electrode is controlled to control the pressure of the hydrogen at the fuel electrode.

The fuel electrode side discharge system 30 discharges gas from the fuel electrode of fuel cell 2 to an area outside of the fuel cell system 100, referred to as an external of the fuel cell system 100, and includes a fuel electrode side discharge plumbing 31 and a purge valve 32. The fuel electrode side discharge plumbing 31 connects a fuel electrode side outlet with an oxidizing agent electrode side discharge plumbing 61 as will be described more fully herein-below. The fuel electrode side discharge plumbing 31 provides a flow passage for introducing gas at fuel electrode to the external. Purge valve 32 is installed in fuel electrode side discharge plumbing 31. The discharge of gas at the fuel electrode is controlled by performing the open or closure operation thereof to interrupt or open the flow passage.

Circulation system 40 recirculates discharge gas discharged from the fuel electrode side of fuel cell 2 to an upstream side of the fuel electrode of fuel cell 2 and includes fuel circulation passage 11 and circulation pump 12. The fuel circulation passage 11 has one end connected to a portion of fuel electrode side discharge plumbing 31 from the fuel electrode side outlet to purge valve 32 and has the other end connected to a portion of the hydrogen gas supply plumbing 22 from the hydrogen tank source valve 7 to the fuel electrode side inlet of the fuel cell 2. Thus, a flow passage is formed to return gas at a downstream side of the fuel electrode of the fuel cell 2 to the upstream side of the fuel electrode. Circulation pump 12 provides a circulation power source installed in fuel circulation passage 11 to return gas discharged from the fuel electrode of fuel cell 2 to the upstream side of the fuel electrode.

An oxidizing agent gas supply system (also known as an oxidizing agent gas supply device) 50 supplies air containing oxygen, which is the oxidizing agent gas, to the oxidizing agent electrode of the fuel cell 2. The oxidizing agent gas supply system 50 includes a compressor 14 (in this embodiment, 51) and air supply plumbing 52. The compressor 14 (51) compresses air and supplies the compressed air to the oxidizing agent electrode of the fuel cell 2. Air supply plumbing 52 connects compressor 14 (51) with an oxidizing agent electrode side inlet of fuel cell 2. In addition, the air supply plumbing 52 serves to introduce air supplied under pressure by the compressor 14 (51) to the oxidizing agent electrode of the fuel cell 2.

The oxidizing agent electrode side discharge system 60 discharges gas from the oxidizing agent electrode of the fuel cell 2 to the external and includes the oxidizing agent electrode side discharge plumbing 61 and a pressure regulating valve 24 that may be an air pressure regulating valve in an embodiment where the oxidizing agent supply is air. The oxidizing agent electrode side discharge plumbing 61 connects the oxidizing agent electrode side outlet to the external. This oxidizing agent side exhaust plumbing 61 connects the outlet of the oxidizing agent electrode of the fuel cell 2 to the external. This plumbing provides a flow passage for introducing gas exhausted from the oxidizing agent electrode side of the fuel cell 2 to the external. The pressure regulating valve 24 is installed in the oxidizing agent electrode side discharge plumbing 61. In addition, an opening angle adjustment of the pressure regulating valve 24 controls the quantity of gas discharged from oxidizing agent electrode. In addition, pressure regulating valve 24 controls the quantity of discharge gas described above to control the pressure of gas at the oxidizing agent electrode. Note that the above-described fuel electrode side discharge plumbing 31 is connected to a downstream side of air pressure regulating valve 24 in oxidizing agent electrode side exhaust plumbing 61.

Furthermore, the above-described fuel cell system 100 includes: current drawing device 70; stack casing 80; and controller 90. Current drawing device 70 serves to draw the current from fuel cell 2. This current drawing device 70 serves to draw the current from fuel cell 2 by performing an electric discharge and charge to a secondary cell. Stack casing 80 is an enclosure to cover the whole surrounding of fuel cell 2. In addition, it is superior in air-tightness. Even if gas starts to leak from fuel cell 2, stack casing 80 is so constructed not to leak from fuel cell 2 to the external of fuel cell system 100. Of course holes through each of which plumbing 22, 31, 52, and 61 is passed are formed.

Controller 90 opens and closes hydrogen supply valve 9 and purge valve 32, the opening angle adjustments of hydrogen tank source valve 7 and air pressure regulating valve 24, and controls drives of circulation pump 12 and compressor 14 (51). Controller 90 can control the supply of gas through fuel gas supply system 20 and oxidizing agent gas supply system 50, the discharge of gas through fuel electrode side discharge system 30, and oxidizing agent electrode side exhaust system 60, the gas circulation through circulation system 40, and controls the drawing of current through the current drawing device. Note that, in a case where the fuel cell system is left off for a long time, at the time of the activation of the system, a presence of a hydrogen front which provides an interface between air left in the fuel electrode and newly supplied hydrogen causes the fuel cell stack to be deteriorated. Specifically, in a case where the hydrogen front is present in the fuel electrode, in the oxidizing agent electrode side faced with a region of the fuel electrode in which hydrogen is not present, such a reaction as described below occurs.

$$C + 2H_2O \rightarrow CO_2 + 4H^+ + 4e^- \quad (3)$$

A corrosion of the carbon support which supports the catalyst made of platinum or so forth occurs and the fuel cell stack is deteriorated. Note that this problem is a common problem not only limited to the fuel cell system in which hydrogen gas and oxygen are supply gases and the catalyst is made of platinum or so forth and is supported by carbon; but, also, to the fuel cell system in which the fuel cell stack is deteriorated due to the same reaction as equation (3).

Next, an operation at the time of the activation of fuel cell system in this embodiment will be explained below.

In this embodiment, at the time of the activation of fuel cell system 100, the controller 90 supplies hydrogen gas to fuel cell 2 through fuel electrode side discharge system 20 inhibiting the gas discharge through fuel electrode side discharge system 30 and supply of air through oxidizing agent gas supply system 50. Therefore, in the fuel cell system 100, in this embodiment, the hydrogen front is moved toward the fuel electrode of the fuel cell 2 and tends to develop the deterioration of the fuel cell 2 due to the reaction of equation (3).

However, in the fuel cell system 100 in this embodiment, at the time of the system activation, the current (a flow of electrons) is drawn through the current drawing device. Therefore, the reaction of equation (3) is suppressed and this results in the suppression of the deterioration of the fuel cell 2.

Figure 9:
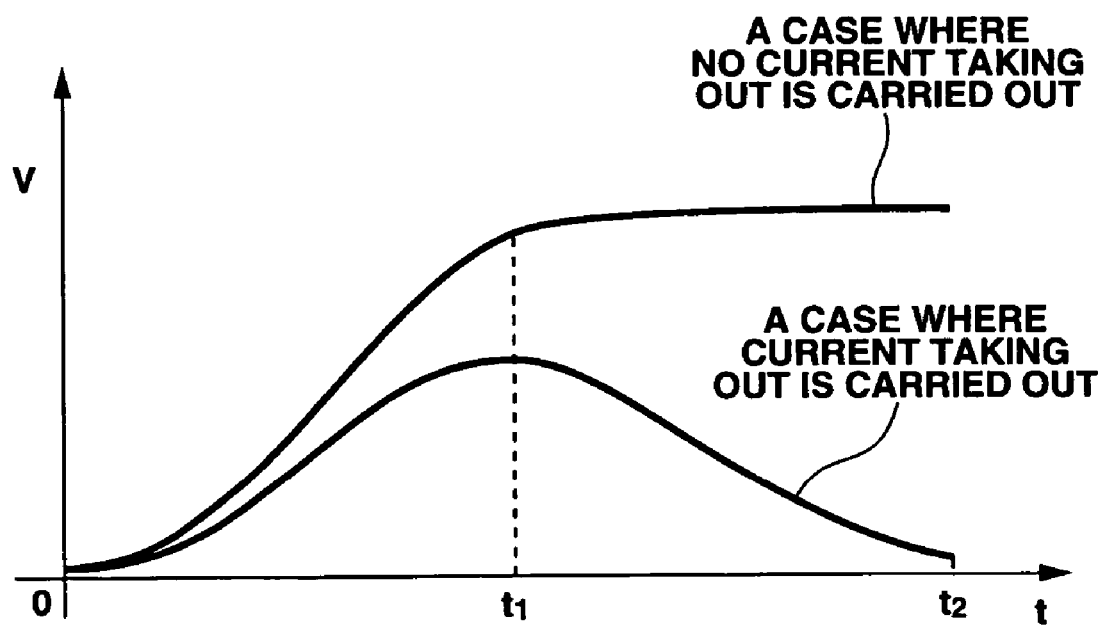
FIG. 9 shows the fuel cell voltage in the instance where current is drawn and an instance where current is not drawn at the time of system activation in accordance with one or more embodiments of the present invention.

FIG. 9 shows an explanatory view for explaining an operation of the fuel cell system 100 in this embodiment at the time of the activation of the fuel cell system 100. In FIG. 9, a longitudinal axis denotes a voltage and a lateral axis denotes a time. In addition, FIG. 9 exemplifies a case where the supply of hydrogen gas to the fuel cell 2 is started at a time point 0 and, simultaneously, the current is drawn from the fuel cell 2.

As shown in FIG. 9, after hydrogen gas is supplied; the reaction in equation (3) is developed due to an influence of the hydrogen front. A voltage is raised up to a time point $t_1$. However, in this embodiment, the current is drawn through current drawing device 70 and, hence, the voltage is lowered. Then, if a case where the current is drawn and a case where the current is not drawn are compared for a peak of the voltage across fuel cell 2, it will be appreciated that the peak of the voltage in the case where the current is drawn is lower than that in the case where the current is not drawn. This indicates that, as the voltage peak becomes higher, the deterioration of fuel cell 2 is progressed due to the reaction in equation (3). Thus, the drawing of current suppresses the deterioration of fuel cell 2 in this embodiment.

Thereafter, in fuel cell system 100 in this embodiment, the supply of oxidizing agent gas is started through oxidizing agent gas supply system 50 at a stage at which the voltage is sufficiently lowered (for example, at a time point $t_2$ in FIG. 9). Note that since, after time point $t_1$, oxygen at the oxidizing agent electrode is consumed and the oxygen concentration is decreased, the voltage does not rise with the reaction in equation (3) developed after time point $t_2$.

Figure 10:
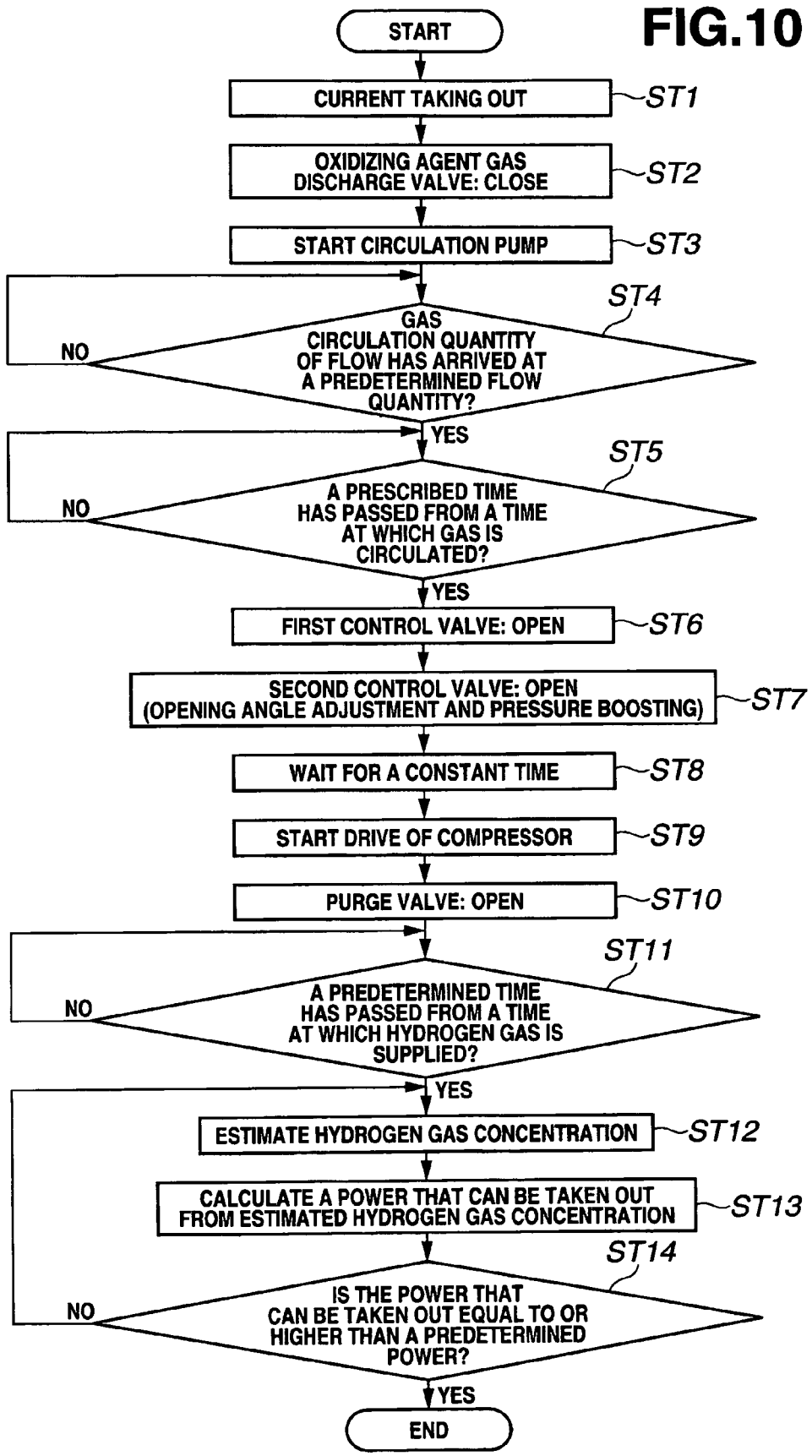
FIG. 10 shows a flowchart representing an example of a detailed operation of a fuel cell system at the time of the activation of the fuel cell system in accordance with one or more embodiments of the present invention.

Next, the detailed operation at the time of activation of the fuel cell system 100 in this embodiment will be described. FIG. 10 shows a flowchart representing one example of the detailed operation at the time of activation of the fuel cell system 100 in this embodiment.

As shown in FIG. 10, first, controller 90 controls current drawing device 70 to draw the current from the fuel cell 2 by controlling current drawing device 70 (a step ST1). The controller 90 closes air pressure regulating valve 24 (oxidizing agent gas discharge valve is closed) (a step ST2) to inhibit the discharge of gas from oxidizing agent electrode. Thus, not only the gas discharge but also air flow into oxidizing agent electrode of fuel cell 2 through oxidizing agent electrode side discharge plumbing 61 is prevented. The reaction of equation (3) is developed in a case where the hydrogen front is present in the fuel electrode and oxygen is present at the oxidizing agent electrode side. Thus, if oxidizing agent gas flow at the oxidizing agent electrode of the fuel cell 2 is prevented, the reaction of equation (3) is suppressed. The deterioration of the carbon support for the catalyst made, for example, platinum can be more effectively suppressed.

Next, controller 90 starts the drive of circulation pump 12 (a step ST3). Therefore, at a stage at which hydrogen gas is, thereafter, supplied to fuel cell 2, the hydrogen front is speedily moved so that the deterioration described above can be suppressed. Then, controller 90 determines whether the circulation flow quantity of gas has arrived at a predetermined flow quantity (a step ST4).

If the controller 90 determines that the circulation flow quantity of gas has not reached the predetermined flow quantity (ST4: No), the same processing is repeated. On the other hand, if the controller 90 determines that the circulation flow quantity of gas has reached the predetermined flow quantity (ST4: Yes), the processing goes to a step ST5. As described above, controller 90 does not start of the supply of hydrogen until the circulation flow quantity of gas reaches the predetermined flow quantity. Thus, the hydrogen front can pass more smoothly.

Note that the predetermined flow quantity is desirably smaller than a gas circulation flow quantity (hereinafter, referred to as a minimum deterioration flow quantity) at which the degree of deterioration of fuel cell 2, obtained from a previously derived correlation data (a data representing a correlation between the degree of deterioration of fuel cell 2 and the circulation flow quantity of gas at the time of start of the supply of hydrogen gas), becomes minimum.

Figure 11:
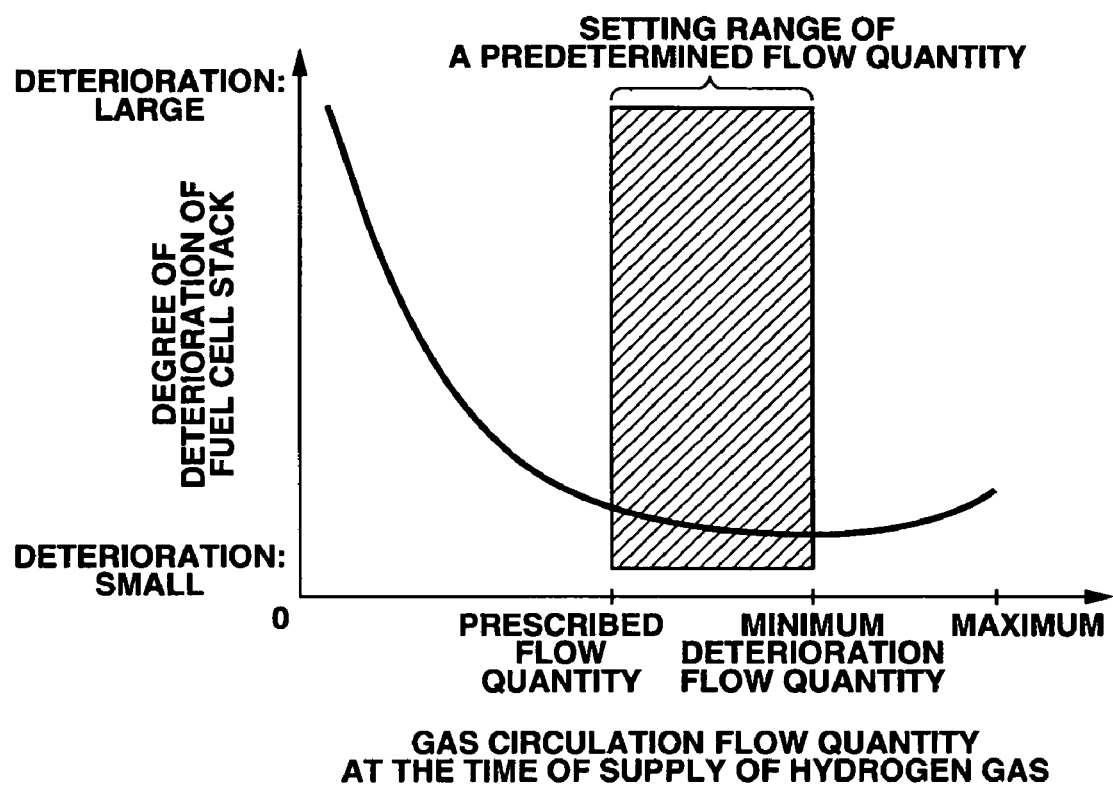
FIG. 11 shows a relationship between the degree of deterioration of the fuel cell stack and the fuel flow quantity in order to determine a prescribed flow quantity in accordance with an embodiment of the present invention.

FIG. 11 is an explanatory view for explaining the predetermined flow quantity. Note that in FIG. 11, the longitudinal axis denotes the degree of deterioration of fuel cell 2 and the lateral axis denotes the gas flow quantity at the time of start of the supply of hydrogen gas. As shown in FIG. 11, in a case where the circulation flow quantity of gas at the time of the start of supply of hydrogen gas is low, a passage speed of the hydrogen front becomes slow and the degree of deterioration of fuel cell 2 becomes high. On the other hand, when the gas circulation flow quantity at the time of the start of hydrogen gas supply is excessively large, the degree of deterioration of fuel cell 2 becomes generally high, (influence on the electrolyte membrane and the circulation pump being included). Fuel cell system 100 has an inherent characteristic as described above. The correlation shown in FIG. 11 can previously be derived. Then, in fuel cell system 100, when gas is circulated, circulation pump 12 is controlled with a minimum deterioration flow quantity at which the degree of deterioration of fuel cell 2 becomes minimum as a target.

In fuel cell system 100 in this embodiment, the predetermined flow quantity is set to be smaller than the minimum deterioration flow quantity. Thus, hydrogen gas is supplied to fuel cell 2 before the circulation flow quantity of gas reaches a minimum deterioration flow quantity. Thus, fuel gas is supplied before the circulation flow quantity of gas arrives at the minimum deterioration flow quantity to shorten an activation time of fuel cell system 100.

Note that excessively small predetermined flow quantity cannot speedily move the hydrogen front. Hence, it is useful for the predetermined flow quantity to be equal to or larger than at least a prescribed flow quantity (minimum deterioration flow quantity→α (alpha)).

Referring again to FIG. 10, the controller 90, at step ST5, determines whether a prescribed time from a time at which gas is circulated has passed. If the controller 90 determines that the prescribed time from the time at which gas is circulated has not passed (step ST5: No), the processing at step ST5 is repeated until the controller 90 determines that the prescribed time has passed. On the other hand, if controller 90 determines that the prescribed time has passed from the time at which gas is circulated step ST5: Yes), the processing goes to a step ST6. As described above, since controller 90 starts to supply hydrogen gas after the prescribed time has passed from the time at which gas is circulated, hydrogen gas is supplied with the circulation speed of gas sufficiently increased. Note that the hydrogen front can be more effectively passed. Note that the prescribed time can be prescribed by deriving, for example, a required time to cause the predetermined flow quantity to flow empirically.

At step ST6, controller 90 opens hydrogen supply valve 9 (a first control valve) (step ST6). Thereafter, controller 90 adjusts the opening angle of hydrogen tank source valve 7 to boost pressure at the fuel electrode of fuel cell 2 (ST7). This pressure boosting increases the quantity of hydrogen gas supplied to the fuel electrode. This pressure boosting can make hydrogen gas extend over each cell at the fuel electrode. Hence, this pressure boosting can prevent a promotion of the deterioration of the oxidizing agent electrode due to a deficiency of hydrogen gas.

In addition, controller 90 executes the pressure boosting to satisfy four conditions described in below. As a first condition, the controller 90 opens the hydrogen supply valve 9 at step ST6 to raise to a predetermined pressure a hydrogen gas pressure with an interval of hydrogen gas supply plumbing 22 from hydrogen supply valve 9 to hydrogen source valve 7. At step ST7, the controller 90 adjusts the opening angle of a second control valve to adjust the pressure at the fuel electrode of fuel cell 2. Note that, if the opening angle of hydrogen tank source valve 7 is adjusted before the pressure in the interval from hydrogen supply valve 9 to hydrogen tank source valve 7 is raised to the predetermined pressure, the pressure itself on the above-described interval becomes unstable and the adjusted pressure at the fuel electrode of fuel cell 2 becomes unstable. The opening angle of hydrogen tank source valve 7 is, however, adjusted after the above-described interval is raised to the predetermined pressure. Thus, the pressure adjustment at the fuel electrode can easily be made.

In addition, as a second condition, controller 90, when the pressure boosting is carried out, adjusts the pressure of gas at the fuel electrode, in order for a difference between the pressure at the fuel electrode of fuel cell 2 and that of the oxidizing agent electrode to be equal to or lower than an allowable pressure. Thus, the deterioration of the electrolyte membrane (a membrane breakage) of fuel cell 2 can be suppressed.

Furthermore, controller 90, at step ST7, starts the supply of hydrogen gas through fuel gas supply system 20. Thus, as a third condition, controller 90 desirably adjusts the pressure at fuel electrode in order for the hydrogen gas concentration at the oxidizing agent electrode of fuel cell 2 not to exceed within an activation time from the time at which the supply of hydrogen gas is started to the time at which the activation of system is completed (i.e., the completion of the flowchart shown in FIG. 10). Since, at step ST7, hydrogen gas is supplied to the fuel electrode and the pressure of the fuel electrode is raised, a cross leak of hydrogen gas occurs and leaked hydrogen gas is moved toward oxidizing agent electrode from a relationship in the pressure difference. If this quantity of movement is increased, the concentration of hydrogen gas at the oxidizing agent electrode becomes high. In addition, in a case where, in a state of the high concentration of hydrogen gas at the oxidizing agent electrode, the oxidizing agent electrode of fuel cell 2 is connected with the external, and the high concentration hydrogen gas is discharged. Therefore, controller 90 adjusts the pressure at fuel electrode in order for the concentration of hydrogen gas at the oxidizing agent electrode of fuel cell not to exceed the predetermined concentration within the activation time from the time at which the supply of hydrogen gas is started to the time at which the activation of the system is completed. Consequently, a large quantity of fuel gas flow into the oxidizing agent electrode from the fuel electrode within the activation time can be prevented.

Furthermore, as a fourth condition, controller 90 desirably adjusts the pressure at the fuel electrode in order for the quantity of hydrogen gas leaked from the fuel electrode of the fuel cell 2 to a stack casing 80 to be equal to or lower than a predetermined quantity (for example, a flow quantity which is equal to or lower than a combustible concentration). This is achieved by sensing the fuel gas concentration by a discharged fuel gas concentration detection device. Once the concentration of the leaked fuel gas is determined, the controller regulates the pressure of the fuel gas in the fuel electrode in order to keep the concentration of the leak fuel gas inside the stack casing below a certain value. Consequently, the fuel gas leaked from the fuel electrode to the stack casing 80 is maintained at or below a predetermined quantity. Thus, a leakage of a large quantity of fuel gas from the fuel electrode to outside of the fuel cell stack can be prevented.

Referring again to the flowchart of FIG. 10, after the opening angle of hydrogen source valve 7 is adjusted at step ST7, controller 90 waits for a fixed time (a step ST8). Thus, as shown in FIG. 9, the controller 90 waits for a reduction in voltage. Note that the fixed time to be waited (for example, a time duration to time point $t_2$ in FIG. 9) is previously measured empirically and is stored in controller 90. In addition, in a case where an oxygen concentration sensor is installed in the fuel cell system 100, the controller 90 may wait until an oxygen concentration is lowered to be equal to or lower than a predetermined concentration.

Thereafter, the controller 90 starts the drive of compressor 14 (at ST9). At this time, controller 90 may adjust the opening angle of the pressure regulating valve 24 to regulate the pressure at the oxidizing agent electrode. Next, controller 90 opens a purge valve 32 to start the discharge of gas at the fuel electrode (at ST10). Then, the controller 90 determines whether a predetermined time has passed from a time at which the supply of hydrogen gas is started at step ST7 (a step ST11).

If the controller 90 determines that the predetermined time has not passed from the start of the supply of hydrogen gas (step ST11: No), the processing is repeated until the controller 90 determines that the predetermined time has passed. On the other hand, if the controller 90 determines that a predetermined time has passed from the time at which the supply of hydrogen gas at ST7 is started (ST11, Yes); the processing is transferred to ST12. As described above, in the fuel cell system 100 in this embodiment, hydrogen gas is supplied to the fuel cell 2 at the time of activation of the system. Thereafter, in a case where the supply of air is carried out, the activation of the system is completed after the predetermined time has passed from the time at which the supply of hydrogen gas is started. Therefore, the activation is completed in a short time after the start of supply of hydrogen gas. Thus, the completion of the system activation can be prevented from occurring in a state in which the quantity of hydrogen gas not insufficient for uniform hydrogen distribution in the unit cells of the fuel cell 2. Note that the predetermined time is a time during which the fuel electrode is sufficiently filled with hydrogen, and the time can be prescribed by a previous derivation thereof empirically and so forth as described above in various embodiments herein.

Thereafter, the controller 90 estimates a concentration of hydrogen at the fuel electrode (at ST12). At a time point of ST12, hydrogen gas is supplied to the fuel electrode and gas is discharged from the fuel electrode. Hence, the concentration of hydrogen gas at the fuel electrode gradually increases. The controller 90 estimates the concentration of hydrogen based upon a time at which the supply of hydrogen gas is started and the diameters of the passages of the plumbing 22, 31, and 61.

The controller 90 calculates a power that can be drawn (namely, a power that is maximally drawn) (hereinafter, also called, a draw enabling power) from the estimated hydrogen gas concentration (at ST13). Then, the controller 90 determines whether the draw enabling power is equal to or larger than a predetermined power (at ST14). If the controller 90 determines that the draw enabling power is not equal or larger than the predetermined power (at ST4: No), the processing is transferred to step ST12 and controller 90 executes again the estimation of the concentration of hydrogen gas. On the other hand, if the controller 90 determines that the draw enabling power is equal to or larger than the predetermined power (at ST4: Yes), the processing shown in FIG. 10 is ended and the system activation is completed. As described above, the concentration of hydrogen gas is estimated, the draw enabling power is calculated from the estimated concentration, and, if the calculated draw enabling power is equal to or larger than the predetermined power, the system activation is completed. Hence, the concentration of hydrogen gas becomes sufficient and the activation is completed at the stage at which the sufficient power is obtained. Thus, for example, in a case where fuel cell system 100 is mounted in the vehicle as the driving power source, a vehicle driver depresses an accelerator pedal in a state where hydrogen gas is insufficient. At this time, a situation in which fuel cell 2 is deteriorated in a state where hydrogen gas becomes deficient can be suppressed. Note that the predetermined power is a power by which a required power generation is drawn from the system and the predetermined power can be prescribed by deriving the predetermined power empirically in advance.

As described above, according to the fuel cell system 100 in embodiment 4, fuel gas is supplied to the fuel cell 2 while the current is drawn from the fuel cell 2 at the time of the system activation without the discharge of fuel gas and the supply of oxidizing agent gas and, thereafter, the supply of oxidizing agent gas is carried out. Therefore, fuel gas is supplied and, due to the presence of the hydrogen front, the reaction as described in equation (3) becomes easy to be developed. However, since the current (the flow of electrons) from fuel cell 2 is drawn, such a reaction as equation (3) is suppressed. Hence, the deterioration of fuel cell 2 can be suppressed.

In addition, since the pressure of gas at the fuel electrode is boosted when fuel gas is supplied at the time of activation of the system, the quantity of fuel gas supplied to the fuel electrode becomes large and the fuel gas becomes easy to be extended over the fuel electrode of each of the cells. Consequently, a promotion of the deterioration at the oxidizing agent electrode of each of the cells due to the deficiency of fuel gas can be prevented.

Furthermore, gas is circulated through the circulation system when fuel gas is supplied at the time of activation of the system. Thus, the hydrogen front is speedily passed at the fuel electrode of fuel cell 2. The deterioration of fuel cell 2 can more sufficiently be suppressed.

In addition, the discharge of gas from the oxidizing agent electrode at the time of the system activation is inhibited. Accordingly, the inflow of oxidizing agent gas to oxidizing agent electrode of fuel cell 2 through the discharge passage of oxidizing agent gas can be prevented. Note that the reaction in equation (3) is developed in a case where the hydrogen front is present at the fuel electrode and oxygen is present at the oxidizing agent electrode. Therefore, when the inflow of oxidizing agent gas to the oxidizing agent electrode is prevented, such a reaction as equation (3) is suppressed. Hence, the deterioration of fuel cell 2 can more sufficiently be suppressed.

In a case where fuel gas is supplied to fuel cell 2 at the time of the system activation and, thereafter, the supply of oxidizing agent gas is carried out, the gas discharge is carried out from the fuel electrode while the supply of fuel gas is continued after the supply of oxidizing agent gas. Then, the concentration of fuel gas at the fuel electrode which changes according to the supply of fuel gas and the discharge of gas is estimated. Thus, when the draw enabling power is calculated from the estimated concentration and the fuel gas concentration at the fuel electrode is estimated. Then, if the draw enabling power is calculated from the estimated concentration and the calculated draw enabling power becomes equal to or larger than the predetermined power, the system activation is completed. Thus, at a stage at which the concentration of fuel gas becomes sufficient and the sufficient power is obtained, the system activation is completed. Thus, for example, in a case where fuel cell system 100 is mounted in the vehicle as the vehicular driving power source, a situation in which the vehicle driver depresses the accelerator in a state where the fuel gas is insufficient and fuel gas becomes deficient can be suppressed.

In addition, in a case where fuel gas is supplied to fuel cell 2 at the time of activation of system and, thereafter, the supply of oxidizing agent gas is carried out, the system activation is completed after the predetermined time has passed from the time at which fuel gas is supplied. Therefore, the system activation is completed in a short time after the start of supply of fuel gas. Thus, a situation in which the system activation is completed in a state where fuel gas at the fuel electrode remains insufficient can be prevented.

When gas is circulated through circulation system 40 and fuel gas is supplied at the time of system activation, first, gas is circulated through circulation system 40 and, thereafter, the supply of fuel gas to fuel cell 2 is started. Thus, as compared with a case where gas is circulated after the start of supply of fuel gas, the hydrogen front can smoothly be passed.

In addition, after the prescribed time has passed from the time at which gas is circulated through circulation system 40, the supply of fuel gas is started. Therefore, since fuel gas is supplied in a state where the circulation speed of gas is sufficiently high, the hydrogen front can more smoothly be passed.

When gas is circulated through the circulation system and the circulation flow quantity of gas reaches the predetermined flow quantity; the supply of gas is started. Thus, since the supply of fuel gas is not started at a stage at which the circulation flow quantity of gas is small, the hydrogen front can more smoothly be passed.

In addition, the predetermined flow quantity is smaller than the minimum deterioration quantity at which the degree of deterioration obtained from a correlation data representing the correlation between the degree of deterioration of fuel cell 2 and the gas circulation flow quantity at the time of the start of the supply of fuel gas becomes minimum. Note that, in a case where the gas circulation flow quantity at the time of start of the supply of fuel gas is low, the passage speed of the hydrogen front or so forth becomes slow and the degree of deterioration of fuel cell 2 becomes high. On the other hand, as the circulation flow quantity of gas at the time of the start of supply of fuel gas becomes larger, the degree of deterioration of fuel cell 2 becomes lower. In addition, excessively large circulation flow quantity at the time of the start of supply of gas, in general, results in the increase of the degree of deterioration (influences on the electrolyte membrane and the circulation pump being included). In fuel cell system 100, the above-described correlation can be derived in advance and the circulation pump of gas is controlled with the minimum deterioration flow quantity at which the degree of deterioration of fuel cell 2 becomes minimum as a target, when gas is circulated. In fuel cell system 100 in this embodiment, since the minimum deterioration flow quantity is set to be smaller than the predetermined flow quantity, fuel gas is supplied to the fuel cell stack before the circulation quantity of gas reaches the minimum deterioration flow quantity. Thus, before the circulation quantity of gas has reached the minimum deterioration quantity, fuel gas is supplied. Consequently, the activation time of fuel cell system 100 can be shortened.

Furthermore, in a case where fuel gas is supplied at the time of activation of the system, the hydrogen supply valve 9 is opened to raise the pressure of the fuel gas at the interval from the hydrogen supply valve 9 to the hydrogen tank source valve 7 to the predetermined pressure and the opening angle of the hydrogen tank source valve 7 is adjusted to regulate the pressure at the fuel electrode of fuel cell 2. Note that, if the opening angle of hydrogen tank source valve 7 is adjusted before the fuel gas pressure at the interval from the hydrogen supply valve 9 to the hydrogen tank source valve 7 is raised to the predetermined pressure, the pressure itself at the above-described interval becomes unstable. Accordingly, the pressure regulation at the fuel electrode of the fuel cell 2 is also unstable. However, since the opening angle of the hydrogen tank source valve 7 after the above-described interval is raised to the predetermined pressure, the pressure regulation at the fuel electrode of the fuel cell 2 can easily be carried out.

In addition, since the pressure at the fuel electrode is adjusted in order for the difference in pressure at the fuel electrode and in pressure at the oxidizing agent electrode to be equal to or lower than the allowable pressure; the deterioration of electrolyte membrane of fuel cell 2 can be suppressed.

Furthermore, the pressure of gas at the fuel electrode is adjusted in order for the concentration of fuel gas at the oxidizing agent electrode of fuel cell 2 not to exceed the predetermines concentration within the activation time from the time at which the supply of fuel gas is started to the time at which the system activation is completed. This can prevent the inflow of the large quantity of fuel gas from the fuel electrode to the oxidizing electrode within the activation time.

Since the pressure at the fuel electrode is adjusted in order for the quantity of fuel gas leaked from the fuel electrode of fuel cell 2 to stack casing 80 to be equal to or lower than a predetermined quantity, a situation in which the large quantity of fuel gas is leaked from the fuel electrode to the external of fuel cell 2 can be prevented. As described hereinabove, although this embodiment has been explained as a series of flows, all of the steps are not essential. For example, it is executable that steps ST4 and ST5 may be replaced with only step ST4 or ST5. In addition, it is executable that steps ST11 and steps ST12 through ST14 may be only step ST11 or only steps ST12 through ST14.

Embodiment 5

The following describes, the fuel cell system in accordance with another embodiment of the present invention. Fuel cell system 200 in this embodiment has the same structure as described in embodiment 4. However, this embodiment is different from embodiment 4 in that a pressure boosting rate is appropriately adjusted when the pressure of gas at the fuel electrode is boosted at the time of activation of the system.

Specifically, in fuel cell system 200 in this embodiment 5, at least one of the following four operations is performed to make the pressure boosting rate appropriate.

In one operation, the controller 90 may set the pressure boosting rate to a first rate at which the deviation of a degree of rise in the voltage of each cell constituting fuel cell 2 becomes minimum. Note that the supply of hydrogen gas to each unit cell easily becomes irregular according to the pressure boosting rate. Then, if the irregularity of the supply of fuel gas to each cell becomes large, namely, if the deviation on the degree of rise in voltage of each of cells becomes large, the deterioration for any one or more of the cells over which hydrogen gas is not sufficiently extended is promoted. However, if the pressure boosting rate is set to the first rate, the deviation on the degree of rise in voltage of each of the cells can be minimized and a stable suppression of the deterioration can be performed. Note that the first rate is varied in accordance with the specification of the fuel cell system and can be empirically derived. In addition, the controller 90 executes the following calculation equation for each of the cells:

(an average of the voltages for the respective cells)−(a voltage of one of the cells intended for a calculation of the deviation).

As a maximum value, from among a plurality of values each derived from the above calculation equation, becomes larger, the controller 90 determines that the deviation also becomes larger.

In addition, as another operation, controller 90 corrects the pressure boosting rate to be higher than the first rate as the deviation of the degree of rise in the voltage in each of the cells becomes larger. It may be considered that a cause of the large deviation on the rise of the deviation for the degree of rise in the cell voltage for each of the cells is an insufficient supply of hydrogen gas due to a clogging of water in a hydrogen gas supply passage to a certain cell. To cope with this inconvenience, the pressure boosting rate is corrected to be higher than the first rate. Thus, water is spattered and hydrogen gas can sufficiently be supplied to the certain cell described above.

In addition, as another operation, the controller 90 corrects the pressure boosting rate to be higher than the first rate as the maximum value of the current that can be drawn through current drawing device 70 becomes smaller. The smaller maximum value of the current that can be drawn (that is maximally drawn) indicates that the supply of hydrogen gas to each cell becomes more insufficient, for example, a case where the reversal of polarity occurs due to a deficiency of fuel gas. Therefore, the correction of the pressure boosting rate to be higher than the first rate permits the sufficient supply of hydrogen gas to each of the cells.

Furthermore, as a fourth operation, controller 90 corrects the pressure boosting rate to minimize the peak of the voltage of fuel cell 2 while drawing the current through current drawing device 70 within a range in which the activation time falls within the target time. This fourth operation will be explained with reference to FIG. 12.

Figure 12:
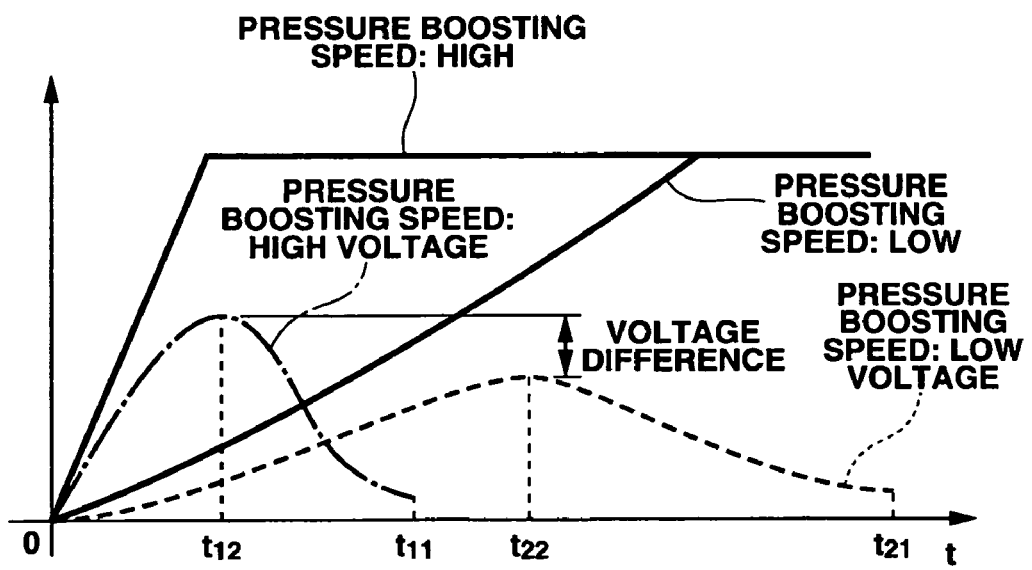
FIG. 12 shows a relationship between an activation time, a voltage peak, and a pressure boosting rate in accordance with an embodiment of the present invention.

FIG. 12 shows a characteristic graph representing a correlation among the activation time, the voltage peak, and the pressure boosting rate. In FIG. 12, the longitudinal axis denotes the pressure boosting rate and the voltage peak and the lateral axis denotes the time (activation time). As shown in FIG. 12, in a case where the pressure boosting rate is high, the voltage reaches the peak at a time point $t_{12}$. In a case where the pressure boosting rate is low, the voltage reaches the peak at a time point $t_{22}$. When both of the peaks are compared with each other, the low pressure boosting rate indicates a low peak. That is to say, as the pressure boosting rate becomes lower, the deterioration of fuel cell 2 can more sufficiently be suppressed. On the other hand, in a case where the pressure boosting rate is high, the voltage is approximately reduced by a time point $t_{11}$. On the other hand, in a case where the pressure boosting rate is low, the voltage is finally reduced at a time point $t_{21}$ which is slower than time point $t_{11}$. As described above, although the voltage peak is reduced if the pressure boosting rate is low, the quantity of the current drawn per unit time is reduced and the activation time is elongated.

In this embodiment, the pressure boosting rate is corrected for the voltage peak of fuel cell 2 to become minimum while the current is drawn within the range in which the activation time falls within the target time. Therefore, the appropriate pressure boosting rate can be achieved harmonizing the deterioration of fuel cell 2 with the time duration to the completion of the system activation. Note that, in place of the fourth operation, the pressure boosting rate may be corrected to minimize the deviations of the respective voltage measurement values within the range in which the activation time falls within the range in which the activation time falls within the target time. This also can achieve the appropriate pressure boosting rate, harmonizing between the deterioration of fuel cell 2 and the time duration to the completion of the system activation.

As described above, according to fuel cell system 200 in embodiment 5, in the same way as embodiment 4, the deterioration of fuel cell 2 can be suppressed. The promotion of the deterioration at the oxidizing agent electrode of each cell due to the deficiency of fuel gas can be prevented. In addition, the deterioration of fuel cell 2 can be suppressed more effectively. A situation in which fuel gas becomes deficient, the deterioration of fuel cell 2 can be suppressed. In addition, a situation in which, although the activation of the system is completed, fuel gas at the fuel electrode remains insufficient can be prevented. Then, the smooth passage of the hydrogen front can be achieved. The activation time of fuel cell system 200 can be shortened with fuel gas supplied before the circulation flow quantity of gas reaches the minimum deterioration flow quantity. The pressure adjustment at the fuel electrode of fuel cell 2 can easily be performed. The inflow of the large quantity of fuel gas from the fuel electrode to the oxidizing agent electrode can be prevented within the activation time. A situation in which the large quantity of fuel gas from the fuel electrode to the external of fuel cell 2 is leaked can be prevented.

Furthermore, in embodiment 5, the pressure boosting rate when the pressure at the fuel electrode is boosted at the time of the system activation is set to the first rate at which the deviation of the degree of rise in voltage of each of the cells constituting fuel cell 2 becomes minimum. Note that, according to the pressure boosting rate of fuel gas, the supply of fuel gas to each of the cells becomes easy to be irregular. Then, if the irregularity of the supply of fuel gas to each of the cells becomes large, i.e., the deviation of the degree of rise in the voltage of each cell becomes large, the deterioration of any one or more of the cells over which fuel gas is not sufficiently extended when the current is drawn can be promoted. However, with the pressure boosting rate set to the above-described first rate, the deviation on the degree of rise in voltage of each of the cells can be minimized and the stable suppression of the deterioration can be achieved.

In addition, as the deviation on the degree of rise in voltage of each of the cells becomes larger, or the minimum value of a quantity of current that is maximally drawn becomes smaller, the pressure boosting rate is corrected to be higher than the first rate. It may be considered that the cause of the large deviation on the degree of rise in the voltage of each cell is a case where water is clogged in the supply passage of fuel gas to the certain cell and the supply of fuel gas accordingly becomes insufficient. Therefore, the correction of the pressure boosting rate to be higher than the first rate can sufficiently supply fuel gas to the unit cells spattering the clogged water.

In addition, as the peak of the voltage of the fuel cell stack becomes low, the deterioration of fuel cell 2 can be suppressed. On the other hand, when the peak of the voltage across fuel cell 2 is set to be too small, viz., when the quantity of current drawn per unit time becomes smaller, the time it takes from the time at which the supply of fuel gas is started to the time at which the system activation is completed becomes longer. In this embodiment, the pressure boosting rate is corrected to minimize the peak of the voltage across fuel cell 2 while the current is drawn within the range in which the activation time from the time at which the supply of fuel gas is started to the time at which the system activation is completed falls within the target time. Therefore, the appropriate pressure boosting rate trade-off between the deterioration of fuel cell 2 and the time at which the system activation is completed can be achieved.

As described above, the present invention has been explained on the basis of the respective embodiments. The present invention is not limited to these embodiments. Various modifications and variations can be made without departing from the scope of the present invention. For example, in each of the embodiments, the explanation has been made as the example of fuel cell in which fuel gas is hydrogen gas, oxidizing agent gas is oxygen in air (air), and the catalyst such as platinum is supported by carbon. However, the present invention is not limited to this. If fuel cell 2 in which the reaction as described in equation (3) is developed is present, another structure may be accepted.

In addition, in embodiment 5, the pressure boosting rate is determined from the above-described four conditions. The present invention is not limited to this. For example, the pressure boosting rate may be maximized within a stably controllable range. Thus, while suppressing the deterioration of fuel cell 2, the pressure boosting rate becomes as high as possible and the activation time can be shortened.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fuel cell system comprising:
    a fuel cell stack comprising a plurality of laminated cells, each of the laminated cells including an electrolyte membrane interposed between a fuel electrode receiving a supply of fuel gas and an oxidizing agent electrode receiving a supply of oxidizing agent gas;
    a fuel gas supply device that supplies a fuel gas to the fuel electrode;
    an oxidizing agent gas supply device that supplies an oxidizing agent gas to the oxidizing agent electrode;
    a fuel electrode side discharge system that discharges a discharge gas from the fuel electrode to an external;
    a circulation device that recirculates the discharge gas discharged from the fuel electrode into an upstream side of the fuel electrode;
    a voltage limit device that limits a voltage across the fuel cell stack by drawing a current from the fuel cell stack at a time of an activation of the fuel cell system; and
    a controller configured to, at the time of the activation of the fuel cell system, delay the supply of the oxidizing agent gas to the oxidizing agent electrode from the oxidizing agent gas supply device, inhibit a discharge of the discharge gas to the external through the fuel electrode side discharge system, and start the supply of fuel gas to the fuel electrode from the fuel gas supply device in a state where the discharge gas is circulated through the fuel cell by the circulation device, then start the supply of oxidizing agent gas to the oxidizing agent electrode.

2. The fuel cell system of claim 1, wherein the circulation device is a circulation pump and the controller is configured to start the supply of fuel gas after the circulation pump is rotated at a rotation speed at which a quantity of circulation of fuel gas to the fuel electrode in each of the laminated cells is uniformly distributed.

3. The fuel cell system of claim 1, wherein the circulation device is a circulation pump and the controller is configured to start the supply of fuel gas after a predetermined time has passed from a time at which a rotation speed of the circulation pump reaches a target rotation speed.

4. The fuel cell system of claim 1, wherein the fuel cell system further comprises a cell voltage sensor that detects a cell voltage for each of the laminated cells, the circulation device is a circulation pump, and the controller is configured to start the supply of the fuel gas after controlling a rotation speed of the circulation pump in order for a deviation of each of the cell voltages detected by the cell voltage sensor to fall within a predetermined value that indicates an acceptably uniform distribution of the fuel gas in the fuel electrode.

5. The fuel cell system of claim 1, wherein the circulation device is a circulation pump and the controller is configured to start the supply of the fuel gas after the circulation pump has reached a rotation speed at which a gas flow quantity at an inlet of the fuel electrode becomes equal to the gas flow quantity at an outlet of the fuel electrode.

6. The fuel cell system of claim 1, wherein the fuel cell system further comprises a control valve that regulates a pressure of the fuel gas at the fuel electrode and wherein the controller is configured to boost the pressure of the fuel gas at the fuel electrode to a predetermined pressure when supplying the fuel gas.

7. The fuel cell system as claimed in claim 6, wherein the fuel gas supply device comprises:
    a storage tank that stores the fuel gas under a first pressure;
    a fuel gas supply line, one end thereof being connected to the storage tank and the other end thereof being connected to an inlet of the fuel electrode, that introduces the fuel gas in the storage tank to the fuel cell stack;
    a first control valve installed in the fuel gas supply line; a second control valve installed at a portion of the fuel gas supply line from the first control valve to the fuel cell stack, and
    wherein the controller, in a case where the controller supplies fuel gas at the time of the activation of the fuel cell system, is configured to open the first control valve to raise the pressure of the fuel gas at a portion of the fuel gas supply line from the first control valve to the second control valve to the first pressure and, thereafter, the controller is configured to adjust an opening angle of the second control valve to regulate the pressure of the fuel gas at the fuel electrode.

8. The fuel cell system of claim 6, wherein the controller is configured to regulate the pressure of the fuel gas at the fuel electrode such that a difference between a pressure at the fuel electrode and a pressure at the oxidizing agent electrode is not greater than an allowable pressure over which the deterioration of the electrolyte may result.

9. The fuel cell system of claim 6, wherein the controller is configured to regulate the pressure of the fuel gas at the fuel electrode such that a concentration of the fuel gas at the oxidizing agent electrode does not exceed a predetermined concentration within an activation time from a time at which the controller starts the supply of the fuel gas to a time at which the controller completes the activation of the fuel cell system.

10. The fuel cell system of claim 6, wherein the fuel cell system further comprises:
a stack casing enclosing the fuel cell stack; and
a discharged fuel gas concentration detection device that detects a fuel gas concentration leaked from the fuel electrode,
wherein the controller is configured to regulate the pressure of the fuel gas at the fuel electrode such that a quantity of fuel gas leaked from the fuel electrode to the stack casing is not greater than a predetermined quantity.

11. The fuel cell system of claim 6, wherein at the time of the activation of the fuel cell system, the controller is configured to set a pressure boosting rate such that a deviation of a degree of rise in a voltage of each of the laminated cells is minimum.

12. The fuel cell system as claimed in claim 6, wherein the fuel cell system further comprises a cell voltage sensor that detects a voltage for each of the laminated cells and wherein at the time of the activation of the fuel cell system the controller is configured to correct a pressure boosting rate such that the pressure of the fuel gas at the fuel electrode is boosted to become higher as a deviation of a degree of rise in voltage for each of the laminated cells becomes larger.

13. The fuel cell system of claim 6, wherein at the time of the activation of the fuel cell system the controller is configured to correct a pressure boosting rate such that the pressure of the fuel gas at the fuel electrode is boosted to become higher as a maximum value of the current that is drawn by means of the voltage limit device becomes smaller.

14. The fuel cell system of claim 6, wherein the controller is configured to operate the voltage limit device within a range such that an activation time from a time at which the controller starts the supply of fuel gas to a time at which the controller completes the activation of the fuel cell system falls within a target time and corrects a pressure boosting rate to minimize a peak voltage of the fuel cell stack.

15. The fuel cell system of claim 1, wherein the fuel cell system further comprises an oxidizing agent electrode side discharge system that discharges the oxidizing agent gas from the oxidizing agent electrode to the external and wherein the controller is configured to inhibit discharge of the oxidizing agent gas through the oxidizing agent electrode side discharge system at the time of the activation of the fuel cell system.

16. The fuel cell system of claim 1,
wherein the controller calculates an electric power that is maximally taken out from the fuel cell stack, and
wherein the controller is configured to detect an electric power that is maximally taken out from the fuel cell stack and wherein the controller completes the activation of the fuel cell system when the electric power detected by the draw enabling power detection device indicates a predetermined electric power.

17. The fuel cell system of claim 16, wherein the fuel cell system further comprises a fuel gas concentration detection device that detects a fuel gas concentration at the fuel electrode and wherein the draw enabling power detection device is configured to indicate the predetermined electric power when the concentration of the fuel gas detected by the fuel gas concentration detection device indicates a predetermined concentration for sufficient power supply.

18. The fuel cell system as claimed in claim 1, wherein the controller is configured to complete the activation of the fuel cell system after a predetermined time that indicates the activation of the fuel cell system has passed from a time at which the controller starts the supply of fuel gas.

19. The fuel cell system as claimed in claim 1, wherein the controller is configured to control a circulation flow quantity of fuel gas, when starting the supply of fuel gas through the circulation device, to be smaller than that when a degree of deterioration of the fuel cell stack, obtained from a correlative data representing a correlation between the degree of deterioration of the fuel cell stack previously derived and the gas recirculation flow quantity at the time of the start of supply of fuel gas, becomes minimum but is larger than a prescribed flow quantity that permits a short activation time.

20. A fuel cell system comprising:
a fuel cell stack comprising a plurality of laminated cells, each of the laminated cells including an electrolyte membrane interposed between a fuel electrode for receiving a supply of fuel gas and an oxidizing agent electrode for receiving a supply of oxidizing agent gas;
means for supplying a fuel gas to the fuel electrode; means for supplying an oxidizing agent gas to the oxidizing agent electrode;
means for discharging discharge gas from the fuel electrode to outside of the fuel cell;
means for recirculating the discharge gas discharged from the fuel electrode into an upstream side of the fuel electrode;
means for limiting a voltage across the fuel cell stack by drawing a current from the fuel cell stack at a time of an activation of the fuel cell system; and
a controller, at the time of the activation of the fuel cell system, configured to delay the supply of the oxidizing agent gas to the oxidizing agent electrode from the means for supplying oxidizing agent gas at the time of the activation of the fuel cell system, configured to inhibit a discharge of the discharge gas to outside of the fuel cell through the fuel electrode side discharging means at the time of the activation of the fuel cell system, and configured to start the supply of fuel gas to the fuel electrode from the fuel gas supplying means in a state where the discharge gas is circulated through the fuel cell by the recirculation means at the time of the activation of the fuel cell system, then starts the supply of oxidizing agent gas to the oxidizing agent electrode.

* * * * *